US009647593B2

(12) United States Patent
Dai et al.

(10) Patent No.: US 9,647,593 B2
(45) Date of Patent: May 9, 2017

(54) SWITCHED RELUCTANCE MOTORS AND EXCITATION CONTROL METHODS FOR THE SAME

(75) Inventors: Shanshan Dai, Jiangsu (CN); Xiaofeng Lu, Jiangsu (CN)

(73) Assignee: Shanshan Dai, Nanjing (CN)

(*) Notice: Subject to any disclaimer, the term of this patent is extended or adjusted under 35 U.S.C. 154(b) by 93 days.

(21) Appl. No.: 14/008,200

(22) PCT Filed: Mar. 29, 2012

(86) PCT No.: PCT/CN2012/000406
§ 371 (c)(1),
(2), (4) Date: Nov. 13, 2013

(87) PCT Pub. No.: WO2012/129964
PCT Pub. Date: Oct. 4, 2012

(65) Prior Publication Data
US 2014/0062379 A1    Mar. 6, 2014

(30) Foreign Application Priority Data

Mar. 30, 2011  (CN) .......................... 2011 1 0077599
Mar. 30, 2011  (CN) .......................... 2011 1 0077614
Jul. 18, 2011   (CN) .......................... 2011 1 0199848

(51) Int. Cl.
*H02P 25/08*    (2016.01)
*H02K 7/08*     (2006.01)
(Continued)

(52) U.S. Cl.
CPC ............. *H02P 25/08* (2013.01); *H02K 7/085* (2013.01); *H02K 19/103* (2013.01);
(Continued)

(58) Field of Classification Search
USPC .................. 318/701, 704, 724, 499; 310/180
See application file for complete search history.

(56) References Cited

U.S. PATENT DOCUMENTS 5,111,095  A  *  5/1992  Hendershot .......... H02K 19/103
                                                    174/DIG. 19
5,365,137  A  *  11/1994  Richardson ............ H02K 1/141
                                                    310/112
(Continued)

FOREIGN PATENT DOCUMENTS

CN           2566525 Y      8/2003
CN           1458730 A     11/2003
(Continued)

OTHER PUBLICATIONS

International Search Report issued in International Application No. PCT/CN2012/000406 dated Jul. 12, 2012.
(Continued)

*Primary Examiner* — Paul Ip
*Assistant Examiner* — Said Bouziane
(74) *Attorney, Agent, or Firm* — Oliff PLC

(57) ABSTRACT

Provided are multiple switched reluctance motors and excitation control methods for same. Motors with various structures are provided having the same structural characteristics, a stator formed of an even number of salient pole pairs and a rotor formed of an even number of salient pole pairs. The salient poles of the stator salient pole pairs are arranged opposite the salient poles of the rotor salient pole pairs, with minimal air gaps left between said salient pole pairs, thus leaving the shortest magnetic return paths between the stator salient pole pairs and the rotor salient pole pairs arranged opposite one another, thus satisfying the minimum reluctance principle of the switched reluctance motor. In addition, due to the magnetic isolation between each stator salient pole pair, the performance of the magnetic pole of each stator salient pole pair is controlled by an excitation control power source and changed independently.

14 Claims, 15 Drawing Sheets

(51) Int. Cl.
*H02K 19/10* (2006.01)
*H02K 21/18* (2006.01)
*H02K 21/22* (2006.01)
*H02M 1/14* (2006.01)

(52) U.S. Cl.
CPC ......... *H02K 21/185* (2013.01); *H02K 21/225* (2013.01); *H02K 2201/12* (2013.01)

(56) References Cited

U.S. PATENT DOCUMENTS

| | | | | |
|---|---|---|---|---|
| 5,459,385 | A | * | 10/1995 | Lipo ........................ H02K 3/28 310/168 |
| 5,545,938 | A | * | 8/1996 | Mecrow ................... H02K 3/18 310/156.64 |
| 5,652,493 | A | * | 7/1997 | Hendershot, Jr. .............. 318/701 |
| 6,140,729 | A | * | 10/2000 | Pollock ................... H02P 25/08 310/162 |
| 2009/0108712 | A1 | * | 4/2009 | Holtzapple .......... H02K 21/125 310/216.004 |

FOREIGN PATENT DOCUMENTS

| | | |
|---|---|---|
| CN | 101483374 A | 7/2009 |
| CN | 102184809 A | 9/2011 |
| CN | 102214979 A | 10/2011 |
| CN | 202049911 U | 11/2011 |
| CN | 102299604 A | 12/2011 |
| CN | 202121473 U | 1/2012 |
| JP | 62-272851 | 11/1987 |
| JP | 2002-369580 A | 12/2002 |
| JP | 2004-104853 A | 4/2004 |
| JP | 2004-194488 A | 7/2004 |
| JP | 2005-124335 A | 5/2005 |
| JP | 2005124309 A * | 5/2005 |
| JP | A-2005-124309 | 5/2005 |
| JP | 2008-537472 A | 9/2008 |

OTHER PUBLICATIONS

Cai et al., "Reversible drive system of switched reluctance motor based on DSP controller," *Journal of Zhejiang University*, Jun. 2006, vol. 40, No. 6, pp. 1019-1026 (with Abstract).

International Preliminary Report on Patentability issued in International Application No. PCT/CN2012/000406 dated Oct. 1, 2013.

Aug. 10, 2015 Office Action issued in Japanese Application No. 2014-501401.

Oct. 15, 2014 Office Action issued in Japanese Application No. 2014-501401.

\* cited by examiner

SWITCHED RELUCTANCE MOTORS AND EXCITATION CONTROL METHODS FOR THE SAME This is a U.S. National stage application under 37 C.F.R. §371 of PCT/CN2012/000406 filed Mar. 29, 2012, which claims priority to Chinese Application No. 2011/10199848.8 filed Jul. 18, 2011, Chinese Application No. 2011/10077614.6 filed Mar. 30, 2011 and Chinese Application No. 2011/10077599.5 filed Mar. 30, 2011. The disclosures of the prior applications are hereby incorporated by reference herein in their entirety.

FIELD OF THE INVENTION

This invention is related to the technical field of motors, especially a new type of switched reluctance motor and the excitation control methods for the same.

BACKGROUND OF THE INVENTION

Switched reluctance motors are usually in a dual-salient pole structural form, to with, there are some salient poles on both the stator and rotor, on the stator, the salient pole is formed by the exciting coil and laminated iron core, and the rotor salient pole is usually made of laminated iron core material, when an exciting current is input into the stator exciting coil, the stator salient pole induces a magnetic pole, which produces a magnetic torque on the salient pole at the rotor. When the exciting current is input into the exciting coils of all phases of the stator arranged on the circumference in a given sequence, the induced magnetic salient poles of the stator produce magnetic torque on the rotor salient poles in turn, to push the rotor to rotate in a fixed direction, as the magnetic circuits of all phases are mutually linked, and because of the presence of magnetic interference, this type of switched reluctance motors are controlled in a pulsed single phase sequence, therefore in each action cycle, only one pair of stator induced magnetic salient pole produces a magnetic torque on the salient pole of rotor, while other stator induced magnetic salient poles show no magnetic polarity, nor producing magnetic torque to the salient pole on the rotor, therefore the motor produces high electromagnetic noise and fluctuation, and the equipment utilization efficiency is low. On the other hand, in a switched reluctance motor with dual salient pole of this structure, the enclosed magnetic circuit between the stator salient poles and rotor salient poles should go through the center of the shaft, the magnetic path is relatively long and the magnetic mass loss is also relatively high, therefore, the applications of switched reluctance motors of this structure are limited to a certain extent.

Content of the Invention

The purpose of this invention is to make structural transform of the traditional doubly salient switched reluctance motors by following the basic principle of "minimum reluctance" of doubly salient switched reluctance motors, it has introduced the structural concept of "stator salient pole pairs" and "rotor salient pole pairs" innovatively, and on the basis of this structural concept, multiple new structures of switched reluctance motors have been designed, to shorten the distance of the enclosed magnetic path between the stator salient poles and rotor salient poles of switched reluctance motors, eliminate the interference between the exciting phases and raise the electromagnetic conversion efficiency.

Another purpose of this invention is to use the corresponding novel excitation control methods for all new types of switched reluctance motors provided in this invention, so that when the switched reluctance motor is running, exciting current is conducting always in more than one phase of stator, that is, the stator exciting salient pole pairs and rotor salient pole pairs (the rotor iron core salient poles or rotor permanent magnet salient pole pairs or rotor exciting salient pole pair) are always under the action of magnetic torque mutually, so as to obtain greater power density and better torque stability.

To realize the above purposes, this invention first transformed the structures of stator salient poles and rotor salient poles in the existing doubly salient switched reluctance motors, and designed unique "stator salient pole pairs" and "rotor salient pole pairs" structures, the "stator salient pole pairs" are formed by exciting coil and iron core materials, and the "rotor salient pole pairs" can be formed by iron core materials, or by the combination of iron core materials and permanent magnetic materials, or by exciting coil and iron core materials. Each "stator salient pole pair" has two salient poles, and so does each "rotor salient pole pair". According to the different setting orientations of the two salient poles of each stator salient pole pair and each rotor salient pole pair, there are "stator salient pole pair" and "rotor salient pole pair" arranged axially along the motor rotating shaft and "stator salient pole pair" and "rotor salient pole pair" arranged radially along the motor rotating shaft. When both salient poles of "stator salient pole pair" and "rotor salient pole pair" are arranged axially along the motor rotating shaft (refer to attached FIGS. 1, 2, 4, 8, 12, 13, 15, 16 and 21), and the two salient poles of the "stator salient pole pair" and the two salient poles of the "rotor salient pole pair" are on completely the identical axial positions in the motor, i.e. the front salient pole of the "stator salient pole pair" is surely opposite to the front salient pole of the "rotor salient pole pair", and there is a minimal magnetic air gap between the opposite salient poles, similarly, the rear salient pole of the "stator salient pole pair" is surely opposite to the rear salient pole of the "rotor salient pole pair", and there is an extremely small magnetic gap between the opposite salient poles. In this way, when the two salient poles of the axially arranged "stator salient pole pair" are aligned with the two salient poles of the axially arranged "rotor salient pole pair", an enclosed magnetic circuit can be formed between the "stator salient pole pair" and "rotor salient pole pair", and this enclosed magnetic circuit encircles axially. The two magnetic salient poles of the stator "exciting salient pole pair" will produce a rotating magnetic torque on the two salient poles of the closest rotor salient pole pairs when the current flows into the stator exciting coil. When both salient poles of "stator salient pole pair" and "rotor salient pole pair" are arranged radially along the motor rotating shaft (refer to attached FIGS. 24 to 27), and the radial centerline (here, the "radial centerline" refers to the radiating line starting from the motor rotating shaft circle center and passing the center point of the arc of the stator exciting salient pole or rotor permanent magnet salient pole) circle center angle of the two salient poles of the "stator salient pole pair" completely equates to the radial centerline circle center angle of the two salient poles of the "rotor salient pole pair", i.e. the left salient pole of the "stator salient pole pair" is definitely opposite to the left salient pole of the "rotor salient pole pair", with a minimal magnetic air gap between the opposite salient poles, similarly, the right salient pole of the "stator salient pole pair" is definitely opposite to the right salient pole of the "rotor salient pole pair", with a minimal magnetic air gap between the opposite salient poles. In this way, when the two salient poles of the "stator salient pole pair" are aligned with the two salient poles of the "rotor salient pole pair", an enclosed magnetic circuit can be formed between the "stator salient pole pair" and "rotor salient pole pair", and this enclosed magnetic circuit encircles axially. As both the axial arrangement and radial arrangement of the "stator salient pole pair" and "rotor salient pole pair" constitutes the "minimum reluctance" principle followed by the drive and rotation of the switched reluctance motor, each "stator salient pole pair" can independently apply magnetic torque to each "rotor salient pole pair", in this way, the excitation control can be conducted for separate phases of the "stator salient pole pairs" exciting coils at different positions in the motor, and it is also possible to supply exciting current simultaneously to two or more phases of exciting coils, thus greatly increasing the rotating torque of motor "stator salient pole pair" acting on the "rotor salient pole pair".

In this invention, in the prerequisite of the afore-said basic design concept of "stator salient pole pair" and "rotor salient pole pair", the following specific structures of switched reluctance motors and corresponding excitation control methods have been formed.

Structure I: inner rotor switched reluctance motor, its stator consists of exciting salient pole pairs, and rotor consists of iron core salient pole pairs, the two salient poles of stator exciting salient pole pair and the two salient poles of rotor iron core salient pole pair are all axially arranged along the motor rotating shaft.

The switched reluctance motor of this structure consists of the rotor, stator and excitation control power source, wherein: this switched reluctance motor stator is formed by the motor housing and an even number of doubly salient pole iron core components wound with exciting coils (i.e. exciting salient pole pairs), the said doubly salient pole iron core component wound with exciting coil is comprised of the iron core and exciting coil, both ends of the iron core wound with exciting coils are provided with two salient poles, an even number of doubly salient pole iron core components with exciting coils are arranged annularly at equal spacing along the motor housing inner wall, these doubly salient pole iron core components wound with exciting coil are mutually in a magnetically isolated state, and the two magnetic salient poles each doubly salient pole iron core component wound with exciting coil are axially arranged, the rotor of this motor is comprised of the rotating shaft and an even number of strip-shaped doubly salient pole iron cores (i.e. the iron core salient pole pair), the even number of strip-shaped doubly salient pole iron cores are arranged radially at equal spacing along the rotating shaft rotor base, the two salient poles at both ends of each strip-shaped doubly salient pole iron core are axially arranged, the two magnetic salient poles of doubly salient pole iron core component wound with exciting coil on the stator and the two salient poles at both ends of the rotor strip-shaped doubly salient pole iron core are arranged opposite to each other, i.e. with equal distance in front of and behind the shaft and with an air gap, with the rotating shaft as the symmetric axis, the exciting coils of two stator doubly salient pole iron core components wound with exciting coils at axially symmetric positions are connected in series or in parallel, and then connected as one phase to the excitation control power source.

In the technical plan above, the said stator and the said rotor form an individual motor, the rotating shafts of two or more such individual motors are axially connected, and the doubly salient pole iron core components wound with exciting coils (i.e. exciting salient pole pairs) on different individual motor stators are at completely identical position in radial space, i.e. all magnetic salient pole radial centerlines of all doubly salient pole iron core components wound with exciting coils (i.e. exciting salient pole pairs) at corresponding positions on different individual motor stators are coincide axially, i.e. on stators of different individuals, between the radial centerlines of doubly salient pole iron core components wound with exciting coils at corresponding positions (i.e. exciting salient pole pairs), the rotating angle around the rotating shaft is zero, while on different individual motor rotors, between the salient pole radial centerlines of strip-shaped doubly salient pole iron cores (i.e. the iron core salient pole pairs) at corresponding positions, the rotating angle around the rotating shaft in sequence in the same direction is 0 to 30 degrees.

In the technical plan above, the strip-shaped doubly salient pole iron cores (i.e. iron core salient pole pairs) on the said motor rotor are mutually in a magnetically isolated state.

In the technical plan above, there are 6 or 8 or 10 or 12 or 14 or 16 or 18 doubly salient pole iron core components wound with exciting coils (i.e. exciting salient pole pairs) on the said stator, corresponding one by one to the number of doubly salient pole iron core components wound with exciting coils (i.e. exciting salient pole pairs) on the afore-said stators, there are 4 or 6 or 8 or 10 or 12 or 14 or 16 rotor strip-shaped doubly salient pole iron cores (i.e. iron core salient pole pairs).

This invention has provided the corresponding excitation control method for the afore-said switched reluctance motor, the switched reluctance motor to which this excitation control method applies consists of rotor, stator and excitation control power source, this switched reluctance motor stator is formed by the motor housing and an even number of doubly salient pole iron core components wound with exciting coils (i.e. exciting salient pole pair), the said doubly salient pole iron core components wound with exciting coils comprising of the iron core and exciting coil, both ends of the iron core wound with exciting coils are provided with two salient pole, the said doubly salient pole iron core components wound with exciting coils is a stator switch component, because, when the forward exciting current is admitted, magnetic polarity can be formed on the two salient poles, when the exciting current disappears, the magnetic polarity on two salient pole also disappears, when reverse exciting current is admitted, reverse magnetic polarity can be formed on the two salient poles, even number of doubly salient pole iron core components with exciting coils are arranged annularly at equal spacing along the motor housing inner wall, these doubly salient pole iron core components wound with exciting coils are mutually in a magnetically isolated state, and the two magnetic salient poles of each doubly salient pole iron core component wound with exciting coils are axially arranged, the rotor of this motor consists of the rotating shaft, rotating shaft seat and an even number of strip-shaped doubly salient pole iron cores (i.e. iron core salient pole pairs), the even number of strip-shaped doubly salient pole iron cores are arranged radially at equal spacing along the peripheral of rotating shaft seat, the two salient poles at both ends of each strip-shaped doubly salient pole iron core are axially arranged, the magnetic salient pole of the doubly salient pole iron core components wound with exciting coils on the stator and salient poles at both ends of the rotor strip-shaped doubly salient pole iron core are arranged opposite to each other, i.e. with equal distance in front of and behind the shaft and with an air gap, with the rotating shaft as symmetric axis, at axially symmetric positions the exciting coils of the two stator switch components (i.e. exciting salient pole pairs) are connected in series or in parallel to form one phase line, forming a total of M phase lines, wherein: the excitation control power source supplies power to M phase lines on the stator in sequence and cyclically, now it is assumed that, the period of the excitation control power source supplying power to phase 1 of stator switch component is $T1_{stator}$, the start time of the excitation control power source supplying power to phase 1 of stator switch component is $t1_{stator\ on}$, the end time of the excitation control power source supplying power to phase 1 of stator switch component is $t1_{stator\ off}$, the period of the excitation control power source supplying power to phase 2 of stator switch component is $T2_{stator}$, the start time of the excitation control power source supplying power to phase 2 of stator switch component is $t2_{stator\ on}$, the end time of the excitation control power source supplying power to phase 2 of stator switch component is $t2_{stator\ off}$, similarly, the period of the excitation control power source supplying power to phase M of stator switch component is $TM_{stator}$, the start time of the excitation control power source supplying power to phase M of stator switch component is $tM_{stator\ on}$, the end time of the excitation control power source supplying power to phase M of stator switch component is $tM_{stator\ off}$, in period $TM_{stator}$ the when excitation control power source supplies power to phase M of the stator switch component, the excitation control power source stops the power supply to phase (M−1), the moment of the excitation control power source stopping the power supply to phase (M−1) is $t(M-1)_{stator\ off}$, while the moment of the excitation control power source starting the power supply to phase 1 is $t1_{stator\ on}$, moment $t1_{stator\ on}$ and moment $t(M-1)_{stator\ off}$ are both in the time period $TM_{stator}$, and there is a time difference $\Delta t_{stator}$ between $t1_{stator\ on}$ and $t(M-1)_{off}$, i.e. $\Delta t_{stator} = t(M-1)_{stator\ off} - t1_{stator\ on}$, only when $\Delta t_{stator}$ is not zero, the excitation control power source simultaneously supplies power to the three adjacent phases of stator switch components, when $\Delta t_{stator}$ is zero, the excitation control power source only simultaneously supplies power to the two adjacent phases of stator switch component, the position sensor sends the stator and rotor position signal to the excitation control power source, which controls the start and end moment of supplying power to each phase line of the stator, thus controlling the running status of the motor.

Structure II: external rotor switched reluctance motor, its stator consists of exciting salient pole pairs, and rotor consists of iron core salient pole pairs, the two salient poles of stator exciting salient pole pairs and the two salient poles of rotor iron core salient pole pairs are all axially arranged along the motor rotating shaft.

In this structure, switched reluctance motor rotor is formed by the motor external rotating housing and an even number of strip-shaped doubly salient pole iron cores (i.e. iron core salient pole pairs), the even number of strip-shaped doubly salient pole iron cores are arranged at equal spacing annularly along the motor external rotating housing, the two salient poles at both ends of each strip-shaped doubly salient pole iron core are axially arranged, and are mutually in a magnetically isolated or non-magnetically isolated state. The stator of this motor is comprised of the base and an even number of doubly salient pole iron core components wound with exciting coils (i.e. exciting salient pole pairs), the even number of doubly salient pole iron core components wound with exciting coils, with the rotating shaft as symmetric axis, are arranged radially at equal spacing on the peripheral of the base, and are mutually in a magnetically isolated state. Each doubly salient pole iron core component wound with exciting coils have two salient poles, these two salient poles are axially arranged, the two salient poles of doubly salient pole iron core components wound with exciting coils on the stator and the two salient poles of rotor strip-shaped doubly salient pole iron core are arranged opposite to each other, i.e. the distance in front of and behind the shaft is equal and with an air gap, with the rotating shaft as symmetric axis, the exciting coils of the two stator doubly salient pole iron core components wound with exciting coils at axially symmetric positions are connected in series or in parallel, and then connected as one phase to the excitation control power source.

In the technical plan above, there are 6 or 8 or 10 or 12 or 14 or 16 or 18 doubly salient pole iron core components wound with exciting coils (i.e. exciting salient pole pairs) on the said stator, corresponding one by one to the number of doubly salient pole iron core components wound with exciting coils (i.e. exciting salient pole pairs) on the afore-said stators, there are 4 or 6 or 8 or 10 or 12 or 14 or 16 strip-shaped doubly salient pole iron cores (i.e. iron core doubly salient pole pairs) on the corresponding rotor.

For the afore-said external rotor switched reluctance motor, this invention has provided the corresponding excitation control method, the switched reluctance motor to which this excitation control method applies consists of the stator, rotor and excitation control power source, the said rotor is formed by the motor external rotating housing and an even number of strip-shaped doubly salient pole iron cores (i.e. iron core salient pole pairs), the even number of strip-shaped doubly salient pole iron cores are arranged annularly at equal spacing along the inner wall of motor external rotating housing, the two salient poles at both ends of each strip-shaped doubly salient pole iron core are axially arranged, and are mutually in a magnetically isolated state. The stator of this motor is comprised of the base and an even number of doubly salient pole iron core components wound with exciting coils (i.e. exciting salient pole pairs), the said doubly salient pole iron core components wound with exciting coils is a stator switch component, because, when a forward exciting current is admitted, magnetic polarity can be formed on the two salient poles, when exciting current disappears, the magnetic polarity of the two salient poles also disappears, when a reverse exciting current is admitted, reverse magnetic polarity can be formed on the two salient poles, the even number of doubly salient pole iron core components wound with exciting coils, with the rotating shaft as symmetric axis, are arranged radially at equal spacing around the base, and are mutually in a magnetically isolated state. Each doubly salient pole iron core component wound with exciting coils has two salient poles, these two salient poles are axially arranged, the salient poles of the doubly salient pole iron core components wound with exciting coils on the stator and rotor strip-shaped doubly salient pole iron core salient poles are arranged opposite to each other with an air gap, with the rotating shaft as symmetric axis, the exciting coils of two stator doubly salient pole iron core components wound with exciting coils at axially symmetric positions are connected in series or in parallel, and then connected as one phase to the excitation control power source, to form a total of M phase lines, wherein: excitation control power source supplies power to M phase lines on the stator in sequence and cyclically, now it is assumed that, the period of the excitation control power source supplying power to phase 1 of stator switch component is $T1_{stator}$, the start time of the excitation control power source supplying power to phase 1 of stator switch component is $t1_{stator\ on}$, the end time of the excitation control power source supplying power to phase 1 of stator switch component is $t1_{stator\ off}$, the period of the excitation control power source supplying power to phase 2 of stator switch component is $T2_{stator}$, the start time of the excitation control power source supplying power to phase 2 of stator switch component is $t2_{stator\ on}$, the end time of the excitation control power source supplying power to phase 2 of stator switch component is $t2_{stator\ off}$, similarly, the period of the excitation control power source supplying power to phase M of stator switch component is $TM_{stator}$, the start time of the excitation control power source supplying power to phase M of stator switch component is $tM_{stator\ on}$, the end time of the excitation control power source supplying power to phase M of stator switch component is $tM_{stator\ off}$, in the period $TM_{stator}$ when excitation control power source supplies power to phase M of the stator switch component, the excitation control power source stops the power supply to phase (M−1), the moment of the excitation control power source stopping the power supply to phase (M−1) is $t(M-1)_{stator\ off}$, while the moment of the excitation control power source starting the power supply to phase 1 is $t1_{stator\ on}$, moment $t1_{stator\ on}$ and moment $t(M-1)_{stator\ off}$ are both in the time period $TM_{stator}$, and there is a time difference $\Delta t_{stator}$ between $t1_{stator\ on}$ and $t(M-1)_{off}$, i.e. $\Delta t_{stator} = t(M-1)_{stator\ off} - t1_{stator\ on}$, only when $\Delta t_{stator}$ is not zero, the excitation control power source simultaneously supplies power to the three adjacent phases of stator switch components, when $\Delta t_{stator}$ is zero, the excitation control power source only simultaneously supplies power to the two adjacent phases of stator switch component, the position sensor sends stator and rotor position signal to the excitation control power source, which controls the start and end moment of supplying power to each phase line of the stator, thus controlling the running status of the motor.

Structure III: inner rotor switched reluctance motor, its stator consists of exciting salient pole pairs, and its rotor also consists of exciting salient pole pairs. The two salient poles of stator exciting salient pole pairs and the two salient poles of rotor exciting salient pole pairs are all axially arranged along the motor rotating shaft, In this structure, the switched reluctance motor consists of the rotor, stator and excitation control power source, wherein: the stator of this motor is comprised of the motor housing and an even number of doubly salient pole iron core components wound with exciting coils (i.e. exciting salient pole pairs), the doubly salient pole iron core components wound with exciting coils on the stator are arranged annularly at equal spacing along the motor housing inner wall, and the doubly salient pole iron core components wound with exciting coils on the stator are mutually in a magnetically isolated state, the rotor of this motor is comprised of the rotating shaft and an even number of doubly salient pole iron core components wound with exciting coils (i.e. exciting salient pole pairs), the doubly salient pole iron core components wound with exciting coils on the rotor are arranged radially at equal spacing along the rotating shaft, and are mutually in a magnetically isolated state, the doubly salient pole iron core components wound with exciting coils on the afore-said stator and the doubly salient pole iron core components wound with exciting coils on the rotor are comprised of iron core and exciting coils, both ends of the iron core wound with exciting coils are provided with two salient pole, the two salient poles of each doubly salient pole iron core component wound with exciting coils are axially arranged, and the salient poles of the doubly salient pole iron core components wound with exciting coils on the stator and the salient poles of the doubly salient pole iron core components wound with exciting coils on the rotor are arranged opposite to each other, with equal distance axially in the front and rear, there is an air gap between the two magnetic salient poles of doubly salient pole iron core components wound with exciting coils on the stator and the two magnetic salient poles of doubly salient pole iron core components wound with exciting coils on the rotor, with the rotating shaft as symmetric axis, the exciting coils of the two stator doubly salient pole iron core components wound with exciting coils at axially symmetric positions are connected in series or in parallel, and then connected as one phase to the excitation control power source, the exciting coils of the two rotor doubly salient pole iron core components wound with exciting coils at axially symmetric positions of the rotating shaft are connected in series or in parallel, and then connected as one phase to the excitation control power source.

In the technical plan above, the said stator and the said rotor form an individual motor, the rotating shafts of two or more such individual motors are axially connected, so that the doubly salient pole iron core components wound with exciting coils (i.e. exciting salient pole pairs) on different individual motor stators are at completely identical position in radial space, i.e. the radial centerlines of all magnetic salient poles of all doubly salient pole iron core components wound with exciting coils at opposite positions on different individual motor stators are coincide axially, i.e. between the radial centerlines of all doubly salient pole iron core components wound with exciting coils at opposite positions on stators of different individuals, the rotating angle around the rotating shaft is zero, while between the radial centerlines of all salient poles of the doubly salient pole iron core components wound with exciting coils (i.e. exciting salient pole pairs) on rotors at opposite positions of different individual motors, the rotating angle around the rotating shaft in sequence in the same direction is 0 to 30 degrees; or all doubly salient pole iron core components wound with exciting coils (i.e. exciting salient pole pairs) at opposite positions on the rotors of different individual motors are at completely identical radial position in space, i.e. the radial centerlines of all salient poles of all doubly salient pole iron core components wound with exciting coils (i.e. exciting salient pole pairs) at opposite positions on the rotors of different individual motors coincide axially, i.e. between the radial centerlines of all doubly salient pole iron core components wound with exciting coils at opposite positions of rotors of different individual motors, the rotating angle around the rotating shaft is zero, while between the radial centerlines of salient poles of all doubly salient pole iron core components wound with exciting coils at opposite positions on stators of different individual motors, the rotating angle around the rotating shaft in sequence in the same direction is 0 to 30 degrees.

In the technical plan above, there are 6 or 8 or 10 or 12 or 14 or 16 or 18 doubly salient pole iron core components wound with exciting coils (i.e. exciting salient pole pairs) on the said stator, corresponding one by one to the number of doubly salient pole iron core components wound with exciting coils (i.e. exciting salient pole pairs) on the afore-said stator, there are 4 or 6 or 8 or 10 or 12 or 14 or 16 doubly salient pole iron core components wound with exciting coils (i.e. exciting salient pole pairs) on the corresponding rotor.

For the afore-said inner rotor switched reluctance motor, this invention has provided the corresponding excitation control method, the switched reluctance motor to which this excitation control method applies consists of the stator, rotor and excitation control power source, the stator of this motor is comprised of the motor housing and an even number of exciting salient pole pairs, the exciting salient pole pairs on the even number of stators are arranged annularly at equal spacing along the motor housing inner wall, and on the even number of stators, exciting salient pole pair are mutually in a magnetically isolated state, the rotor of this motor is comprised of the rotating shaft and an even number of exciting salient pole pairs, on the even number of rotors, the exciting salient pole pair are arranged radially at equal spacing along the rotating shaft, and on the even number of rotors, the exciting salient pole pair are mutually in a magnetically isolated state, the exciting salient pole pairs on the afore-said stator and exciting salient pole pairs on the rotor is formed by the iron core and exciting coils, the stator exciting salient pole pair is the stator switch component, and rotor exciting salient pole pair the rotor switch component, on the stator the two salient poles of each exciting salient pole pair are axially arranged, on the rotor the two salient poles of each exciting salient pole pair are axially arranged, and the two salient poles of the exciting salient pole pair on the stator and the two salient poles of the exciting salient pole pair on the motor are arranged opposite to each other, and there is an air gap between the two salient poles of the exciting salient pole pair on the stator and the two salient poles of the exciting salient pole pair on the rotor, with the rotating shaft as symmetric axis, the exciting coils of the two stator exciting salient pole pairs at axially symmetric positions are connected in series or in parallel, and then connected as one phase to the excitation control power source, to form a total of M phase lines, the exciting coils of two rotor exciting salient pole pairs at rotating shaft axially symmetric positions are connected in series or in parallel, and then connected as one phase to the excitation control power source, to form a total of N phases, wherein: excitation control power source supplies power to M phase lines on the stator in sequence and cyclically, concurrently, the excitation control power source also supplies power to N phase lines on the rotor in sequence and cyclically, now it is assumed that, the period of the excitation control power source supplying power to phase 1 of stator switch component is $T1_{stator}$, the start time of the excitation control power source supplying power to phase 1 of stator switch component is $t1_{stator\ on}$, the end time of the excitation control power source supplying power to phase 1 of stator switch component is $t1_{stator\ off}$, the period of the excitation control power source supplying power to phase 2 of stator switch component is $T2_{stator}$, the start time of the excitation control power source supplying power to phase 2 of stator switch component is $t2_{stator\ on}$, the end time of the excitation control power source supplying power to phase 2 of stator switch component is $t2_{stator\ off}$, similarly, the period of the excitation control power source supplying power to phase M of stator switch component is $TM_{stator}$, the start time of the excitation control power source supplying power to phase M of stator switch component is $tM_{stator\ on}$, the end time of the excitation control power source supplying power to phase M of stator switch component is $tM_{stator\ off}$, in period $TM_{stator}$ when excitation control power source supplies power to phase M of the stator switch component, the excitation control power source stops the power supply to phase (M−1), the moment of the excitation control power source stopping the power supply to phase (M−1) is $t(M-1)_{stator\ off}$, while the moment of the excitation control power source starting the power supply to phase 1 is $t1_{stator\ on}$, moment $t1_{stator\ on}$ and moment $t(M-1)_{stator\ off}$ are both in the time period $TM_{stator}$, and between $t1_{stator\ on}$ and $t(M-1)_{stator\ off}$, there is a time difference $\Delta t_{stator}$, $\Delta t_{stator}=t(M-1)_{stator\ off}-t1_{stator\ on}$, only when $\Delta t_{stator}$ is not zero, i.e. between the moment $t1_{stator\ on}$ and moment $t(M-1)_{stator\ off}$, the excitation control power source supplies simultaneously to the three adjacent phases of stator switch components, when $\Delta t_{stator}$ is zero, the excitation control power source only simultaneously supplies power to the two adjacent phases of stator switch component; similarly, it is supposed that, the excitation control power source supplies power to N phase lines on the rotor in sequence and cyclically, i.e. the period of the excitation control power source supplying phase 1 of rotor switch component is $T1_{rotor}$, the start time of the excitation control power source supplying phase 1 of rotor switch component is $t1_{rotor\ on}$, the end time of the excitation control power source supplying phase 1 of rotor switch component is $t1_{rotor\ off}$, the period of the excitation control power source supplying phase 2 of rotor switch component is $T2_{rotor}$, the start time of the excitation control power source supplying phase 2 of rotor switch component is $t2_{rotor\ on}$, the end time of the excitation control power source supplying phase 2 of rotor switch component is $t2_{rotor\ off}$, similarly, the period of the excitation control power source supplying phase N of rotor switch component is $TN_{rotor}$, the start time of the excitation control power source supplying phase N of rotor switch component is $tN_{rotor\ on}$ the end time of the excitation control power source supplying phase N of rotor switch component is $tN_{rotor\ off}$, in the period $TN_{rotor}$ when the excitation control power source supplies power to phase N of the rotor switch component, the excitation control power source stops the power supply to the (N−1)th phase, the moment of the excitation control power source stopping the power supply to phase (N−1) is $t(N-1)_{rotor\ off}$, while the moment of the excitation control power source starting the power supply to phase 1 is $t1_{rotor\ on}$, moment $t1_{rotor\ on}$ and moment $t(N-1)_{rotor\ off}$ are both within $TN_{rotor}$, and between $t(N-1)_{rotor\ off}$ and $t1_{rotor\ on}$, there is a time difference $\Delta t_{rotor}$, $\Delta t_{rotor}=t1_{rotor\ on}-t(N-1)_{rotor\ off}$, when $\Delta t_{rotor}$ is not zero, i.e. between the moment $t1_{rotor\ on}$ and the moment $t(N-1)_{rotor\ off}$, the excitation control power source supplies power to one phase of rotor switch component, when $\Delta t_{rotor}$ is zero, the excitation control power source supplies power simultaneously to both phases of the rotor switch component, the position sensor sends stator and rotor position signal to the excitation control power source, which controls the start and end time of supplying power to various phase lines of the motor stator and rotor, thus controlling the running status of the motor.

Structure IV: inner rotor switched reluctance motor, its stator consists of exciting salient pole pairs, and its rotor consists of permanent magnet salient pole pairs. The two salient poles of stator exciting salient pole pairs and the two salient poles of rotor permanent magnet salient pole pairs are all axially arranged along the motor rotating shaft.

In this structure, the switched reluctance motor consists of the stator, rotor and motor housing, wherein: the said stator is formed by a number of exciting salient pole pairs, the exciting salient pole pairs, with the motor rotating shaft as symmetric axis, are arranged annularly and symmetrically at equal spacing along a concentric circle, within the motor housing, all exciting salient pole pairs are mutually in a magnetically isolated state, and two salient poles are axially arranged, the said rotor is formed by a number of permanent magnet salient pole pairs, the permanent magnet salient pole pairs, with the motor rotating shaft as symmetric axis, are arranged annularly and symmetrically at equal spacing along a concentric circle around the rotor base. The salient poles of adjacent permanent magnet salient pole pairs are in opposite magnetic polarity, the salient pole axial positions and thickness of the permanent magnet salient pole pairs on the rotor and the salient pole axial positions and thickness of the exciting salient pole pairs on the stator are identical, and when the rotor rotates, the rotating vertical plane perpendicular to the rotating shaft formed by the salient poles of the permanent magnet salient pole pairs on the rotor coincide with the vertical plane perpendicular to the rotating shaft formed by the salient poles of the stator exciting salient pole pair, and the radial centerline of two salient poles of any rotor permanent magnet salient pole pair can respectively and correspondingly coincide with the radial centerline of two salient poles of any stator exciting salient pole pairs.

In the technical plan above, the said exciting salient pole pair is formed by a laminated iron core and exciting coils, the exciting coil is wound around the laminated iron core, the two ends of the laminated iron core extending out of the exciting coil constitute the two salient poles, when current of the same direction is input into the exciting coil, these two salient poles are in opposite magnetic polarity; the said permanent magnet salient pole pair is formed by two permanent magnets and one magnetizer, one end of the magnetizer is connected to the N pole of a permanent magnet, the other end of the magnetizer is connected to the S pole of a permanent magnet, forming a permanent magnet salient pole pair with an S pole and an N pole; or the said permanent magnet salient pole pair is formed by a permanent magnet and two magnetizer, one magnetizer is connected to the permanent magnet N pole, another magnetizer is connected to the S pole of this permanent magnet, also forming a permanent magnet salient pole pair with an N pole and an S pole.

In the technical plan above, there are 6 or 8 or 10 or 12 or 14 or 16 or 18 exciting salient pole pairs on the said stator, and corresponding one by one to the number of exciting salient pole pairs on the afore-said stator, there are 4 or 6 or 8 or 10 or 12 or 14 or 16 permanent magnet salient pole pairs on the corresponding rotor.

In the technical plan above, there are 8 exciting salient pole pairs on the said stator, the 8 exciting salient pole pairs, with the motor rotating shaft as symmetric axis, are arranged annularly and symmetrically at equal spacing along a concentric circle, and the two magnetic salient poles of each exciting salient pole pair are axially arranged along the rotating shaft, the 8 exciting salient pole pairs are mutually in a magnetically isolated state; on the said rotor there are 6 permanent magnet salient pole pairs, the 6 permanent magnet salient pole pairs, with the motor rotating shaft as symmetric axis, are arranged annularly and symmetrically at equal spacing along a concentric circle around the rotor base, each permanent magnet salient pole pair consisting of a strip-shaped magnetizer and two permanent magnets, one end of the strip-shaped magnetizer is connected to the N pole of a permanent magnet, the other end of the strip-shaped magnetizer is connected to the S pole of a permanent magnet, the N pole salient pole and S pole salient pole of each permanent magnet salient pole pair are axially arranged along the rotating shaft, and the salient poles of adjacent permanent magnet salient pole pairs at the same axial end are in opposite magnetic polarity, the vertical plane where the salient poles of the stator exciting salient pole pairs are located coincides with the rotating plane formed by the rotor permanent magnet salient pole pair rotating salient poles; the exciting coils of the 8 exciting salient pole pair are divided into 4 groups, the two exciting salient pole pairs on the same diameter line are in the same group, the exciting coils of the same group of exciting salient pole pairs are connected in series or in parallel, the 4 groups of exciting salient pole pairs are respectively excited and controlled by 4 phases of exciting current.

In the technical plan above, the said 8 stator exciting salient pole pairs and the said 6 rotor permanent magnet salient pole pairs form an individual motor, the rotating shafts of two or more such individual motors are axially connected, and all exciting salient pole pairs of different individual motor stators are at completely identical position in radial space, i.e. the radial centerlines of all salient poles of the exciting salient pole pairs of different individual motor stator coincide, and between the radial centerlines of all salient poles of different individual motor rotor permanent magnet salient pole pairs, the rotating angle around the rotating shaft in sequence in the same direction is 0 to 30 degrees.

Structure V: outer rotor switched reluctance motor, its stator consists of exciting salient pole pairs, and its rotor consists of permanent magnet salient pole pairs. The two salient poles of stator exciting salient pole pairs and the two salient poles of rotor permanent magnet salient pole pairs are all axially arranged along the motor rotating shaft.

In this structure, the switched reluctance motor consists of the stator, rotor and motor housing, wherein: the said rotor is formed by the motor external rotating housing and an even number of permanent magnet salient pole pairs, the even number of permanent magnet salient pole pairs are arranged along the motor external rotating housing inner wall annularly at equal spacing, the N pole salient pole and S pole salient pole of each permanent magnet salient pole pair are axially arranged along the rotating shaft, and the salient poles of adjacent permanent magnet salient pole pairs at the same axial end are in opposite magnetic polarity, the stator of this motor is comprised of the base and an even number of exciting salient pole pairs, the even number of exciting salient pole pairs, with the rotating shaft as symmetric axis, are symmetrically set at equal spacing around the base, and the exciting salient pole pairs are mutually in a magnetically isolated state, the two magnetic salient poles of each exciting salient pole pair are axially arranged along the rotating shaft, the vertical plane where the salient poles of the stator exciting salient pole pairs are located coincide with the rotating vertical plane formed by the rotor permanent magnet salient pole pair salient pole rotation, the exciting coils of the two stator exciting salient pole pairs at positions of the same diameter are connected in series or in parallel, and are excited and controlled by the exciting current of the same phase.

Structure VI: outer rotor switched reluctance motor, its stator consists of exciting salient pole pairs, and its rotor consists of permanent magnet salient pole pairs. The two salient poles of stator exciting salient pole pairs and the two salient poles of rotor permanent magnet salient pole pairs are all radially arranged along the motor rotating shaft.

In this structure, the switched reluctance motor consists of the stator, rotor and motor housing, wherein: the said rotor is formed by the cylindrical magnetizer and 6 permanent magnet blocks, the 6 permanent magnet blocks, with the rotating shaft as symmetric axis, symmetrically set at equal spacing on inner wall of the cylindrical magnetizer, and the salient poles of the adjacent two permanent magnet blocks are in opposite magnetic polarity, the adjacent two permanent magnet blocks, via the magnetic connection by the cylindrical magnetizer, form the permanent magnet salient pole pairs, the cylindrical magnetizer is in fixed connection with the rotating shaft via a non-magnetic conducting connecting plate; the said stator is formed by 4 exciting salient pole pairs, each exciting salient pole pair is formed by the laminated iron core with two salient poles and the exciting coils wound around this laminated iron core, the 4 exciting salient pole pairs, with the rotating shaft as symmetric axis, are symmetrically set at equal spacing around the stator base, the 4 exciting salient pole pairs are mutually in a magnetically isolated state, the vertical plane where the 4 salient poles of the stator exciting salient pole pairs are located coincides with the rotating vertical plane formed by the rotation of the rotor permanent magnet salient pole pair salient pole, the circle center angle between the radial centerlines of the two salient poles of each stator exciting salient pole pair and circle center angle between the radial centerlines of the two permanent magnet salient poles of rotor permanent magnet salient pole pair are equal, the exciting coils of the 4 stator exciting salient pole pairs are respectively excited and controlled by four phases of exciting current, or exciting coils of two stator exciting salient pole pairs at opposite positions are mutually connected in series or parallel, and excited and controlled by two phases of exciting current.

Structure VII: inner rotor switched reluctance motor, its stator consists of exciting salient pole pairs, and its rotor consists of permanent magnet salient pole pairs. The two salient poles of stator exciting salient pole pairs and the two salient poles of rotor permanent magnet salient pole pairs are all radially arranged along the motor rotating shaft.

In this structure, the switched reluctance motor consists of the stator, rotor and motor housing, wherein: the said rotor is formed by the rotor base, cylindrical magnetizer and 6 permanent magnets, the rotating shaft is fixed with the rotor base, the cylindrical magnetizer surrounds the rotor base, the 6 permanent magnets, with the rotating shaft as symmetric axis, are symmetrically set at equal spacing around the cylindrical magnetizer, and the adjacent two permanent magnet salient pole are in opposite magnetic polarity, the adjacent two permanent magnets, via the magnetic connection by the cylindrical magnetizer, form the permanent magnet salient pole pair; the said stator is formed by 4 exciting salient pole pairs, each exciting salient pole pair is formed by the laminated iron core with two salient poles and the exciting coils wound around this laminated iron core, the 4 exciting salient pole pairs, with the rotating shaft as symmetric axis, are symmetrically set at equal spacing on motor housing inner wall, the vertical plane where the 4 salient poles of the stator exciting salient pole pairs are located coincides with the vertical plane formed by the rotation of the rotor permanent magnet salient pole pair salient poles, the circle center angle between the radial centerlines of any two permanent magnet salient poles of the rotor permanent magnet salient pole pair and the circle center angle between the radial centerlines of the two salient poles of each stator exciting salient pole pair are equal, the exciting coils of the 4 stator exciting salient pole pairs are respectively excited and controlled by four phases of exciting current, or exciting coils of two stator exciting salient pole pairs at opposite positions are mutually connected in series or parallel, and excited and controlled by two phases of exciting current.

This invention has provided similar excitation control methods for the four types of switched reluctance motors of the afore-said structure IV, structure V, structure VI and structure VII.

This excitation control method has the feature that, once the radial centerline of the salient poles of a permanent magnet salient pole pair on the rotor coincides with the radial centerline of the salient poles of any exciting salient pole on the stator, the position sensors respectively fixed on the rotor and stator produces a signal, which, via the excitation control power source, turns on and off the current for the exciting coil of the exciting salient pole pair coincided with the radial centerline according to the set control program, following which, the reverse current is input, so that magnetic polarity of the exciting salient pole pair salient pole coincided by this radial centerline is changed, while the exciting coil current in the other exciting salient pole pair remains unchanged, until the radial centerline of another exciting salient pole pair salient pole coincides with the radial centerline of the permanent magnet salient pole pair salient pole, and this process is repeated cyclically.

In the technical plans for the switched reluctance motors of the afore-said structures IV, V, VI and VII, stator "exciting salient pole pair" and rotor "permanent magnet salient pole pair" are the most fundamental work making units of the motor. Both stator exciting salient pole pair and rotor permanent magnet salient pole pair have salient poles of different magnetic polarity in pairs, the magnetic polarity of the two salient poles of the rotor permanent magnet salient pole pair is fixed unchanged, while the magnetic polarity of the two inducing magnetic salient poles of the stator exciting salient pole pair changes under the control by the exciting coil current direction. In space positions, the salient poles of rotor permanent magnet salient pole in circumferential arrangement and the salient poles of stator exciting salient pole pair also in circumferential arrangement are completely identical in the axial positions and thickness, in other words, the vertical plane of the salient poles of the stator exciting salient pole pair coincides with the vertical plane of the salient poles of the rotor permanent magnet salient pole pair, to ensure precise axial position of the salient poles of stator exciting salient pole pair and salient poles of rotor permanent magnet salient pole pair, and "strictly opposite" of stator salient poles and rotor salient poles. During the rotation of rotor, the salient pole of each rotor permanent magnet salient pole pair will be "opposite" in turn with the salient poles of each stator exciting salient pole pair, in other words, the so-called "opposite" means that, the radial centerline of salient poles of rotor permanent magnet salient pole pair coincides with the radial centerline of salient poles of stator exciting salient pole pair. The "radial centerline" here refers to the radiating line starting from the motor rotating shaft circle center, and passing through the center point of the arc section of the stator exciting salient pole or rotor permanent magnet salient pole. Because the switched reluctance motors in the afore-said structures IV, V, VI and VII can ensure in structure and mounting dimensions the radial centerline circle center angle of salient poles of stator exciting salient pole pair is equal to that of the salient poles of rotor permanent magnet salient pole pair, therefore it can be ensured that the salient poles of all rotor permanent magnet salient pole pairs can align with the salient poles of any stator exciting salient pole pair. Before the salient poles of stator exciting salient pole pair are "strictly opposite" to the salient poles of rotor permanent magnet salient pole pair, the magnetic polarity of the two salient poles of the stator exciting salient pole pair is opposite to that of the two salient poles of the rotor permanent magnet salient pole pair, and there is a magnetic attracting force between the stator exciting salient pole pair and rotor permanent magnet salient pole pair, when the salient poles of stator exciting salient pole pair and salient poles of rotor permanent magnet salient pole pair are at the "strictly opposite" position, there is only a minimal air gap between the salient poles of the stator exciting salient pole pair and the salient poles of the rotor permanent magnet salient pole pair, thereby forming the shortest magnetic circuit, and the stator exciting salient pole pair and rotor permanent magnet salient pole pair are in the attracted and closed state, when at this time the excitation control power source makes the exciting current of that stator exciting salient pole pair exciting coil zero transiently, and right after changes the current direction in the exciting coil of that stator exciting salient pole pair, the magnetic polarity of the salient poles of that stator exciting salient pole pair changes immediately, and the magnetic polarity of the "strictly opposite" salient poles of stator exciting salient pole pair changes as identical to that of the salient poles of rotor permanent magnet salient pole pair, at this moment, an expelling force is immediately produced between that stator exciting salient pole pair and the rotor permanent magnet salient pole pair. Because in the switched reluctance motors of the afore-said structures IV, V, VI and VII, all stator exciting salient pole pairs are mutually in a magnetically isolated state, therefore each stator exciting salient pole pair is subjected to independent excitation control by the excitation control power source, and its magnetic polarity of its magnetic salient pole can be changed independently. In this way, during the rotation of the rotor, every permanent magnet salient pole pair on the rotor can scan in turn and be "strictly opposite" to every exciting salient pole pair on the stator, when the permanent magnet salient pole pair on the rotor is at a position between the two stator exciting salient pole pairs, the rotor permanent magnet salient pole pair receives not only the magnetic attracting force from the stator exciting salient pole pair in the front of its rotating direction, or the "pulling force", but also the magnetic repelling force from the stator exciting salient pole pair in the rear of its rotating direction, or the "pushing force". The "pulling force" and "pushing force" here are just the source of the torque of the motor rotor, but in the traditional switched reluctance motor there is only the magnetic attracting force between the stator salient pole and rotor salient pole, or the "pulling force". In addition, in the switched reluctance motors of the afore-said structures IV, V, VI and VII, the mutual torque acting force does not exist only when the salient poles of the rotor permanent magnet salient pole pair are "strictly opposite" the salient poles of the stator exciting salient pole pair, and between all other stator exciting salient pole pairs and rotor permanent magnet salient pole pairs with salient poles not opposite, the "shortest magnetic path principle" of switched reluctance motors applies, so the rotor permanent magnet salient pole pair is applied with the magnetic attracting force from the stator exciting salient pole pair in the front of its rotating direction and the magnetic repelling force from the stator exciting salient pole pair in the rear of its rotating direction, i.e. in the switched reluctance motors of the afore-said structures IV, V, VI and VII, there is always more than one rotor permanent magnet salient pole pair being "pulled and pushed" by its nearby stator exciting salient pole pair. Furthermore, in the switched reluctance motors of the afore-said structures IV, V, VI and VII, the rotor permanent magnet salient pole pairs and stator exciting salient pole pairs at "strictly opposite" position only stop doing work in the moment of change of current direction, and the rotor permanent magnet salient pole pair will do work under the "pulling ahead and pushing in the rear" action by the nearby stator exciting salient pole pairs as long as it has deviated from the "strictly opposite" position. In the switched reluctance motors of the afore-said structures IV, V, VI and VII, during one revolution of the motor rotor, the work doing time between the individual stator exciting salient pole pairs and rotor permanent magnet salient pole pairs has been increased, and the total work doing time between all stator exciting salient pole pairs and rotor permanent magnet salient pole pairs of the motor has also been greatly increased. In summary, in the rotor rotation period of the switched reluctance motors of the afore-said structures IV, V, VI and VII, it is the increase of the number of rotor permanent magnet salient poles and stator exciting salient poles participating in doing work and the increase of work doing time that enable the motor to obtain greater torque and power density, and also lower fluctuation and better stability.

The excitation control method adopted for switched reluctance motors of structures IV, V, VI and VII in this invention can be applied to all types of AC permanent magnet switched reluctance motors with continuous torque. The feature of this excitation control method is that the angular coordinates between the salient pole radial centerline of all permanent magnet salient pole pairs on the rotor and salient pole radial centerline of all exciting salient pole pairs on the stator is used as the reference for excitation control. As the rotor rotates, the salient pole radial centerline positions of all permanent magnet salient pole pairs on the rotor and the salient pole radial centerline position of all exciting salient pole pairs on the stator are scanned one by one, when a salient pole radial centerline of a rotor permanent magnet salient pole pair and a salient pole radial centerline of a stator exciting salient pole pair coincide, the position sensor located between the rotor and stator outputs a signal to the excitation control power source, and the excitation control power source controls the exciting current of the exciting salient pole pair exciting coil that has brought the radial centerline to coincide and makes this current zero transiently, following which, the reverse exciting current is input, to change the magnetic polarity of the salient poles of that exciting salient pole pair, so as to immediately eliminate the negative torque between the stator and rotor permanent magnet, and also produce a magnetic repelling rotating torque on the permanent magnet salient pole pair just deviating from the "strictly opposite" position on the rotor, meanwhile, a magnetic attracting force is formed on another nearby permanent magnet salient pole pair on the rotor, i.e. when a salient pole of rotor permanent magnet salient pole pair is N pole, as the rotor displaces in a given rotating direction angle, the salient poles of stator exciting salient pole pair in front of it has the magnetic polarity S, and the salient poles of stator exciting salient pole pair behind it has the magnetic polarity N, at this moment, the N salient pole of that rotor permanent magnet salient pole pair is subjected to both the pushing force (expelling force) from the N pole of the stator exciting salient pole behind its rotating direction, and the pulling force (attracting force) from the S salient pole of the stator exciting salient pole pair in front of its rotating direction, so that the rotor can make a given angular displacement in the rotating direction under the action of pushing force and pulling force torques of the magnetic salient poles of the stator exciting salient pole pairs. This continual cycling "pushing" and "pulling" forms an enclosed attracting magnetic field and expelling magnetic field in the rotor air gap, to push the rotor to rotate continually in a given rotating direction. In this torque magnetic field in the air gap of stator and rotor, except for an extremely short period when the radial centerlines of the salient poles of rotor permanent magnet salient pole pair and of the salient poles of stator exciting salient pole pair coincide, there is no action of torque magnetic field action between the rotor permanent magnet salient pole pair and stator exciting salient pole pair at the position with their radial centerlines coinciding, the torque magnetic field acts at all other angles, to wit, the said "pushing" force and "pulling" force are applied by salient poles of different stator exciting salient pole pairs simultaneously on the salient poles of the same rotor permanent magnet salient pole pair, in other words, the rotor permanent magnet salient pole pair always receives simultaneously the "pushing" force and "pulling" force from the stator exciting salient pole pairs in front and behind its rotating direction at all times, while the time interval of radial centerline of the salient poles of stator exciting salient pole pair coincide with the radial centerline of the salient poles of rotor permanent magnet salient pole pair is very short as compared with the time period of the stator exciting salient pole pairs acting on the rotor permanent magnet salient pole pairs in the form of torque magnetic field, in this way, a continuous torque is realized between the stator and rotor, thus greatly increasing the torque and power density, it can also ensure very smooth and stable running of the motor, to extend the service life of motor.

The Advantages of this Invention:

1. This invention is the first to introduce the basic concepts of "stator salient pole pair" and "rotor salient pole pair" of switched reluctance motor, and presents the specified structural designs for "exciting salient pole pair" of stator and "core salient pole pairs", "permanent magnet salient pole pair" and "exciting salient pole pairs" of rotor. In-depth discussions were made for the acting conditions and relations between "stator salient pole pair" and "rotor salient pole pair", a smart structural design for the new type switched reluctance motor was presented, to tactfully and efficiently apply the "minimal magnetic circuit principle" followed by traditional switched reluctance motors in the switched reluctance motors in new structure, and shorten the length of the necessary enclosed magnetic circuit in the switched reluctance motors, meanwhile, the "stator salient pole pairs" are magnetically isolated to each other, so that the magnetic polarity performance of each "stator salient pole pair" is controlled by the excitation control power source and therefore can be changed independently, in this way, each "stator salient pole pair" can participate to the maximum extent in doing work on the "rotor salient pole pairs", so that the motor can generate greater continuous torque and power density.

2. This invention also presented the design to make structural reform of existing switched reluctance motors, although the structural form given is simple, it can produce immeasurable actual effect and upgrade in an all-round way the performance of existing switched reluctance motors, offering a realistic possibility for the development and extensive application of existing switched reluctance motors.

3. The motors of new structures and structural reform of existing switched reluctance motors presented in this invention have laid the foundation conditions for adopting a completely novel excitation control method, and also extended the field of excitation control technology for switched reluctance motors.

4. The motors and the corresponding excitation control method presented in this invention can obtain quite high torque in switched reluctance motors, the excitation control power source is simple, the speed regulation and control power source features low cost, high reliability and long service life, with substantially reduced volume and weight, therefore they are new varieties of motors with very high performance to price ratio and energy consumption ratio, and are also energy conserving and environmental-friendly, able to replace many motors now used in motor-driven tools, automobiles, household electrical appliances, and for industrial drive and control purposes, hence new type motors with very high promotional value.

5. The whole motor is in module design and can substantially save copper and ferromagnetic materials, furthermore, one-time forming process is adopted for most parts, making it possible to realize streamline production, greatly increasing labor productivity and cutting production cost.

Figure 1:
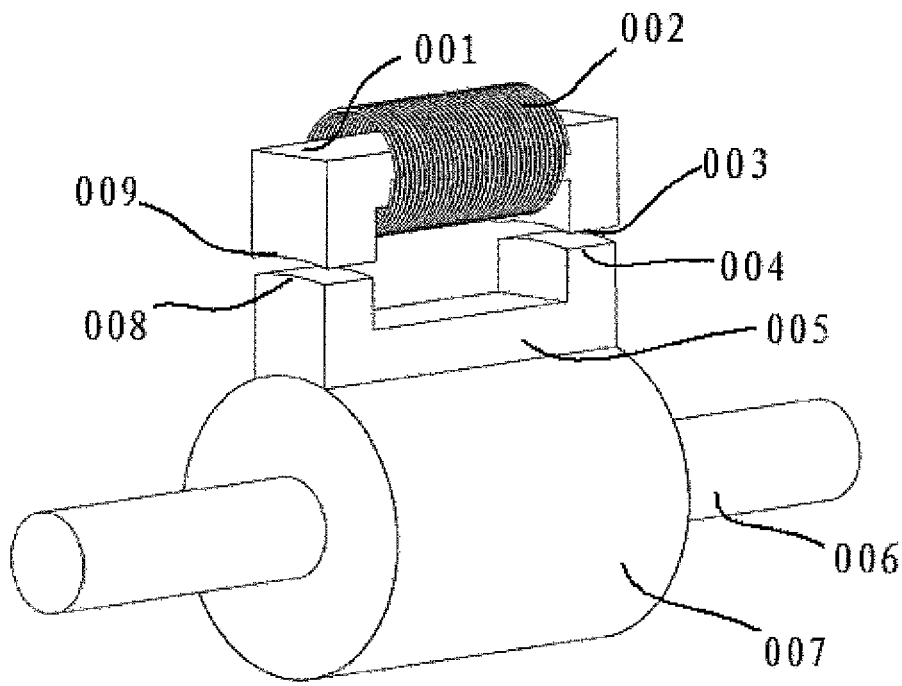
FIG. 1 is the structural schematic diagram of the axial arrangement of the stator exciting salient pole pair and rotor iron core salient pole pair in Embodiment 1 of this invention.

In the attached figures above, 001 is the strip-shaped doubly salient pole iron core, 002 is the exciting coil, 003 is the stator magnetic salient pole, 004 is the rotor magnetic salient pole, 005 is the rotor strip-shaped doubly salient pole iron core, 006 is the rotating shaft, 007 is the rotor shaft seat, 008 is the rotor magnetic salient pole, 009 is the stator magnetic salient pole, 101 is the front magnetic salient pole of the doubly salient pole iron core components wound with exciting coils (i.e. exciting salient pole pair) A on stator, 102 is the rear magnetic salient pole of the doubly salient pole iron core components wound with exciting coils (i.e. exciting salient pole pairs) A on stator, 103 is the exciting coil, 104 is the rear salient pole of the strip-shaped doubly salient pole iron core (i.e. iron core salient pole pairs) II on rotor, 105 is the front salient pole of the strip-shaped doubly salient pole iron core (i.e. iron core salient pole pairs) II on rotor, 106 is the rotor shaft seat, 107 is the rotating shaft, 201 is the rotating housing, 202 is the outer rotor strip-shaped doubly salient pole iron core, 203 is the salient pole of the outer rotor strip-shaped doubly salient pole iron core, 204 is the salient pole of the stator doubly salient pole iron core components wound with exciting coils, 205 is the exciting coil of the stator doubly salient pole iron core components wound with exciting coils, 206 is the rotating shaft bearing, 207 is the rotating shaft, 208 is the stator base, 209 is the stator iron core, 301 is the exciting coil, 302 is the salient pole of the doubly salient pole iron core components wound with exciting coils on stator, 303 is the permanent magnet salient pole, 304 is the strip-shaped iron core, 305 is the rotating shaft, 306 is the rotor shaft seat, 307 is the permanent magnet salient pole, 308 is the salient pole of the doubly salient pole iron core components wound with exciting coils on stator, 401 is the exciting coil, 402 is the rear permanent magnet salient pole of the permanent magnetic doubly salient pole strip, 403 is the front permanent magnet salient pole of the permanent magnetic doubly salient pole strip, 404 is the iron core of the doubly salient pole iron core components wound with exciting coils on stator, 405 is the rear salient pole of the doubly salient pole iron core components wound with exciting coils on stator, 406 is the front salient pole of the doubly salient pole iron core components wound with exciting coils on stator, 407 is the strip-shaped iron core of the permanent magnetic doubly salient pole strip on rotor, 408 is the rotor shaft seat, 409 is the rotating shaft, 501 is the exciting coil, 502 is the salient pole of the doubly salient pole iron core components wound with exciting coils on stator, 503 is the magnetic salient pole of the rotor doubly salient pole permanent magnetic strip, 504 is the permanent magnet of the rotor doubly salient pole permanent magnetic strip, 505 is the rotating shaft, 506 is the rotor shaft seat, 507 is the magnetic salient pole of the rotor doubly salient pole permanent magnetic strip, 508 is the salient pole of the doubly salient pole iron core components wound with exciting coils on stator, 601 is the exciting coil, 602 is the iron core of the doubly salient pole iron core components wound with exciting coils on stator, 603 is the permanent magnet of the rotor doubly salient pole permanent magnetic strip, 604 is the rear magnetic salient pole of the rotor doubly salient pole permanent magnetic strip, 605 is the front magnetic salient pole of the rotor doubly salient pole permanent magnetic strip, 606 is the rear salient pole of the doubly salient pole iron core components wound with exciting coils on stator, 607 is the front salient pole doubly salient pole iron core components wound with exciting coils on stator, 608 is the rotor shaft seat, 609 is the rotating shaft, 701 is the magnet conducting rotating housing, 702 is the permanent magnet salient pole, 703 is the exciting coil of the stator exciting salient pole pair, 704 is the iron core of the stator exciting salient pole pair, 705 is the rotating shaft bearing, 706 is the rotating shaft, 707 is the stator base, 708 is the salient poles of the stator exciting salient pole pair, 801 is the cylindrical magnetizer, 802 is the permanent magnet salient pole, 803 is the salient pole of the exciting salient pole pair, 804 is the exciting coil of the exciting salient pole pair, 805 is the stator base, 901 is the motor housing, 902 is the exciting coil of the exciting salient pole pair, 903 is the salient pole of the exciting salient pole pair, 904 is the permanent magnet salient pole, 905 is the cylindrical magnetizer, 906 is the rotor base, and 907 is the rotating shaft.

MODE OF CARRYING OUT THE INVENTION

Embodiment 1

Figure 2:
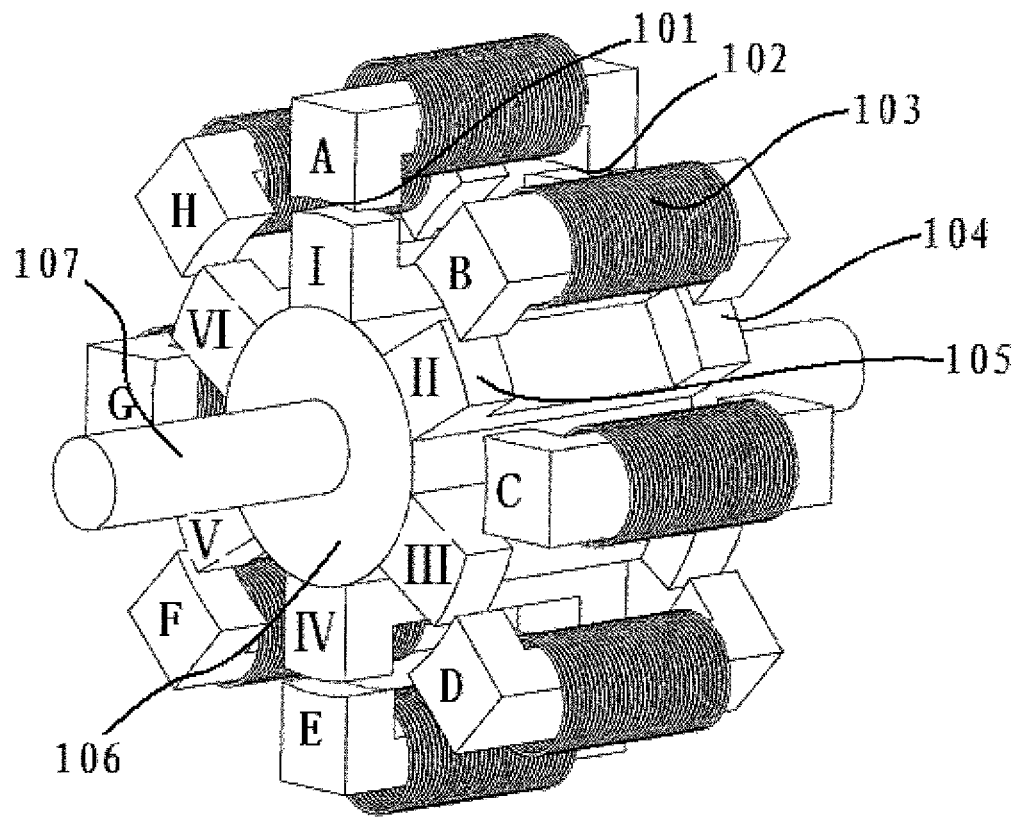
FIG. 2 is the schematic diagram of the space structure of Embodiment 1 of this invention.
Figure 3:
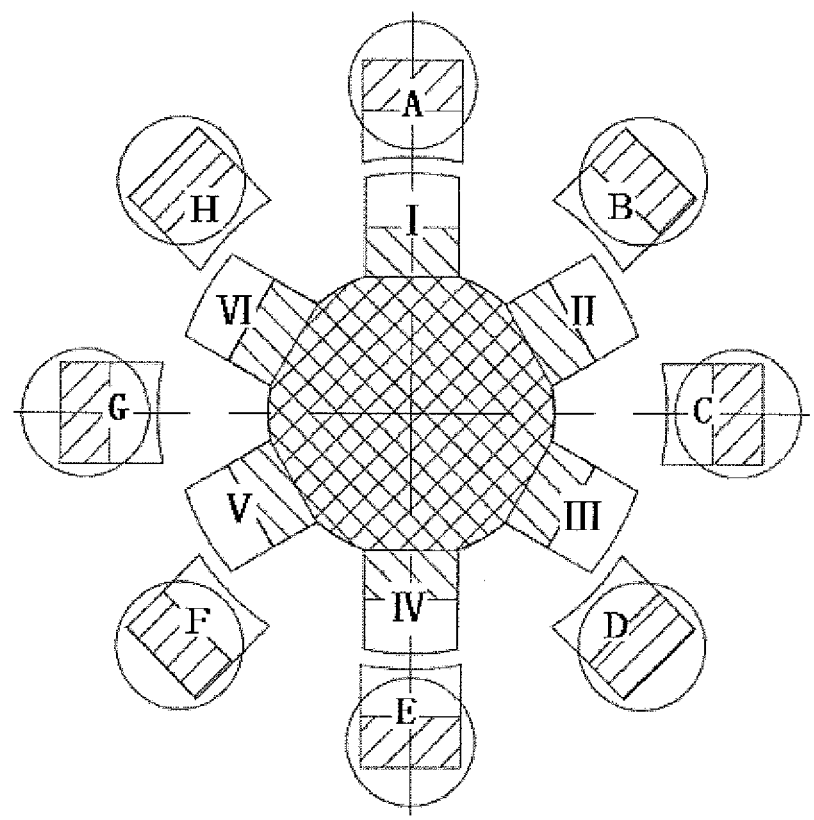
FIG. 3 is the sectional view of Embodiment 1 of this invention.

The structure of this embodiment is as shown in Attached FIG. 2, the sectional view of the structure of this embodiment is as shown in Attached FIG. 3.

In this embodiment, the stator contains 8 doubly salient pole iron core components wound with exciting coils (i.e. the 8 exciting salient pole pair), these 8 doubly salient pole iron core components wound with exciting coils are fixed symmetrically at equal spacing on the motor housing inner wall, and in the doubly salient pole iron core components wound with exciting coils, the magnetic salient pole 101 and magnetic salient pole 102 point to the motor rotating shaft 107. The rotor shaft seat 106 and rotating shaft 107 are fixed, the 6 strip-shaped doubly salient pole iron core (i.e. the 6 iron core salient pole pairs) are, with the rotating shaft 107 as the symmetric axis, fixed symmetrically at equal spacing on the rotor shaft seat 106, each strip-shaped doubly salient pole iron core has two salient poles, the extruding parts of the strip-shaped doubly salient pole iron core salient pole 104 and strip-shaped doubly salient pole iron core salient pole 105 point to the radial direction of the rotating shaft. Each stator doubly salient pole iron core components wound with exciting coils has two magnetic salient poles, these two magnetic salient pole 101 and 102 are axially distributed along the rotating shaft, the 8 stator components have a total of 8×2 magnetic salient poles, while the 6 rotor strip-shaped doubly salient pole iron cores have a total of 6×2 salient poles, the salient poles 104 and 105 of each rotor strip-shaped doubly salient pole iron core are also axially distributed along the rotating shaft. The stator component magnetic salient pole and rotor strip-shaped doubly salient pole iron core salient pole are arranged opposite to each other, with a minimal air gap between them. The exciting coils of the 8 doubly salient pole iron core components wound with exciting coils of the motor stator are connected in series or in parallel two by two, forming 4 phase lines, i.e. the exciting coils of stator component A and component E are connected in series or in parallel, the exciting coils of stator component B and component F are connected in series or in parallel, the exciting coils of stator component C and component G are connected in series or in parallel, and the exciting coils of stator component D and component H are connected in series or in parallel.

In this embodiment, the excitation control power source supplies power to single phase of the stator one by one. When the excitation control power source supplies power to the exciting coil of stator component A-E phase line, a magnetic field is formed by the 4 magnetic salient poles of the stator components A and E, attracting the salient pole of the closest two salient poles of the rotor strip-shaped doubly salient pole iron core, to form the shortest magnetic line circuit, this magnetic torque makes the rotating shaft rotate by a given angle, when the 4 magnetic salient poles of the stator components A and E are just opposite to the 4 salient poles of rotor strip-shaped doubly salient pole iron core I and rotor strip-shaped doubly salient pole iron core IV, the excitation control power source immediately stops the power supply to the exciting coils of stator component A-E phase line, the 4 magnetic salient poles of the stator components A and E then cancels the acting force on the 4 salient poles of rotor strip-shaped doubly salient pole iron cores I and IV, at the same time of stopping the power supply to the exciting coil of A-E phase line, the excitation control power source supplies power to the exciting coil of stator component B-F phase line, the magnetic salient poles of stator component B-F phase line will also act on the closest salient poles of the rotor strip-shaped doubly salient pole iron core salient pole, so that the rotating shaft is rotated again by a given angle. The excitation control power source supplies power to the exciting coils of all phases of stator components, to keep the rotating shaft rotating. The positions of the stator and rotor in Attached FIG. 3 indicates the moment when the stator D-H phase line is just to be energized, the B-F phase line and C-G phase line are not energized and A-E phase line is just to be de-energized when the rotor is rotating clockwise.

Embodiment 2

Figure 4:
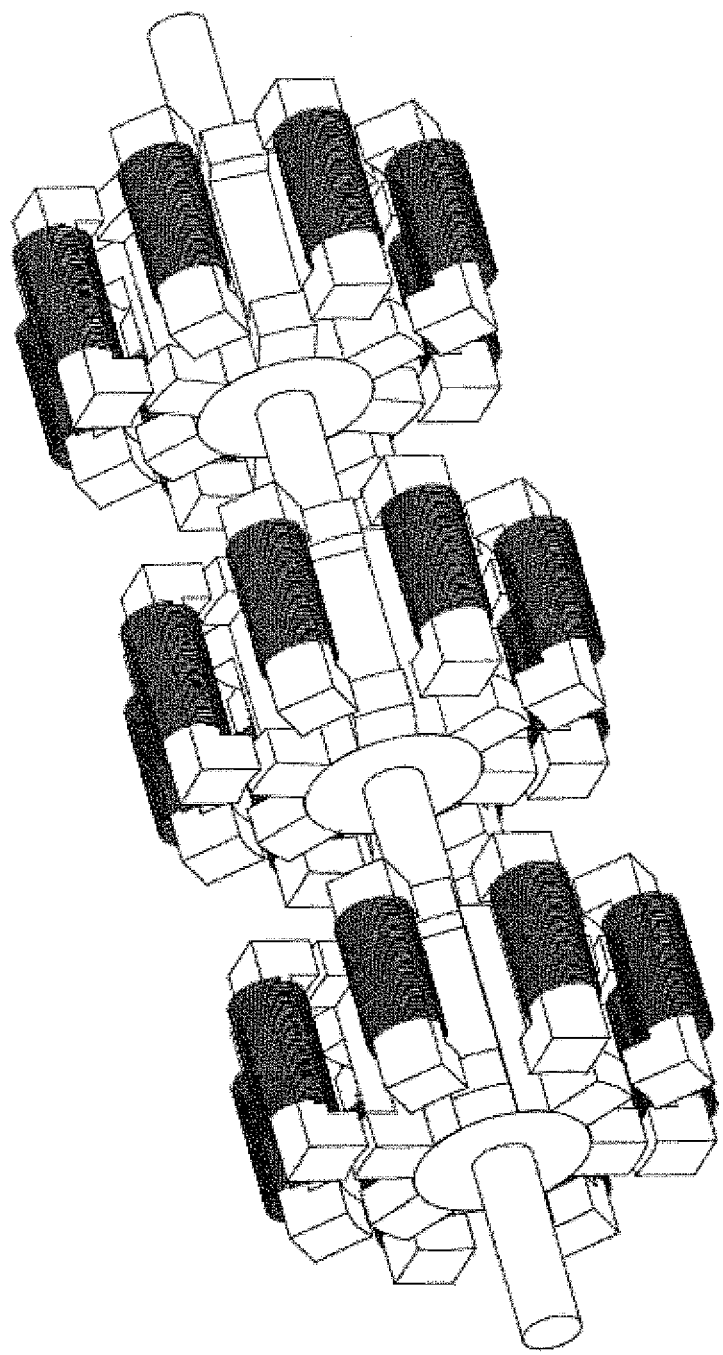
FIG. 4 is the schematic diagram of the space structure of Embodiment 2 of this invention.

The structure of this embodiment is as shown in Attached FIG. 4.

Figure 5:
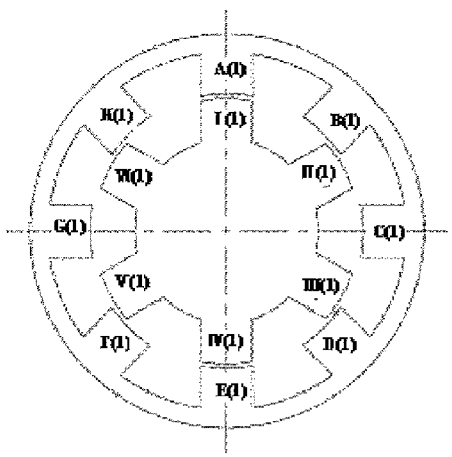
FIG. 5 is the sectional view of the structure of the front individual motor in Embodiment 2 of this invention.
Figure 6:
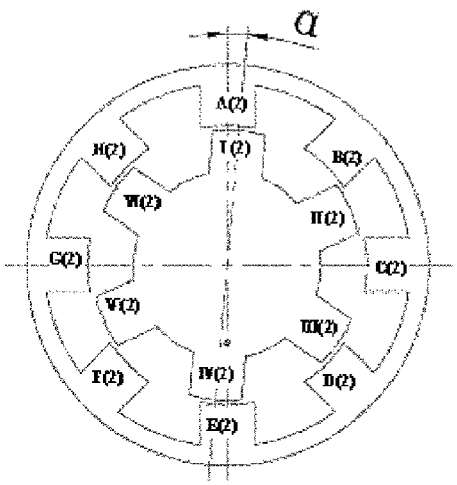
FIG. 6 is the sectional view of the structure of the middle individual motor in Embodiment 2 of this invention.
Figure 7:
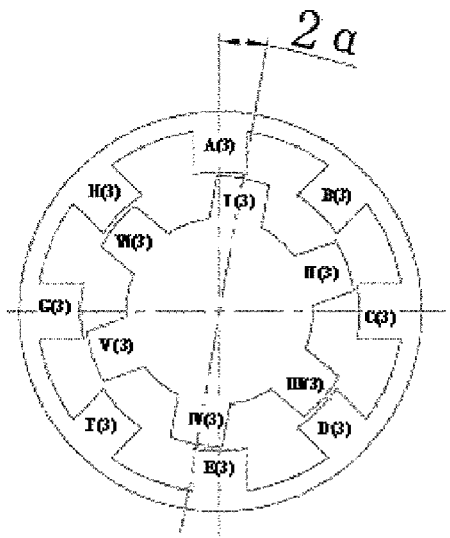
FIG. 7 is the sectional view of the structure of the rear individual motor in Embodiment 2 of this invention.

This embodiment is a further structure on the basis of the motor given in the afore-said. Embodiment 1. The motor given in the afore-said Embodiment 1 is an individual motor in this embodiment. Three individual motors share one rotating shaft. As shown in Attached FIG. 4, the relative positions between the stators of the three individual motors are completely identical, i.e. there is no rotating angle difference between the radial centerlines of the magnetic salient poles of the stator doubly salient pole iron core components wound with exciting coils (i.e. stator exciting salient pole pairs) of the three individual motors, but between the radial centerlines of the salient poles of the rotor strip-shaped doubly salient pole iron core (i.e. iron core salient pole pairs) of the three individual motors, there is a rotating angle difference $\alpha$. Attached FIG. 5 shows the sectional view of the individual motor at the front most, Attached FIG. 6 shows the sectional view of the individual motor in the middle, and Attached FIG. 7 shows the sectional view of the individual motor at the rear most. In the figures, the angle $\alpha$ is the rotating angle set between the radial centerlines of salient poles of rotor strip-shaped doubly salient pole iron cores of different individual motors, and $\alpha$ is 5 degrees. The three individual motors so arranged have realized the fine division of step angles of individual motors, and also, at any angle of rotation, power is supplied to a number of phases in a number of layers to produce a rotating torque. This enables increasing the output power, achieving the effect of stable start and running of switched reluctance motor with multiple salient pole pairs.

For the switched reluctance motor given in this embodiment, for each individual motor, power is supplied to single phases of the stator in sequence cyclically, however, for corresponding phase lines on different individual motor stators (the corresponding phase line is the first phase $(A-E)_1$ of the front individual motor and the first phase $(A-E)_2$ of the middle individual motor and the first phase $(A-E)_3$ of the rear individual motor), there is a fixed time difference between the moment of power supply, and this time difference is associated with the rotating angle $\alpha$ of the rotor radial centerlines between different individual motors. The position sensors provided on the motor stators and rotors send the stator and rotor positions signals to the excitation control power source, which controls the start and end moment of supplying power to the stator phase lines of the three individual motors, thus controlling the running status of the three individual motors.

Embodiment 3

Figure 8:
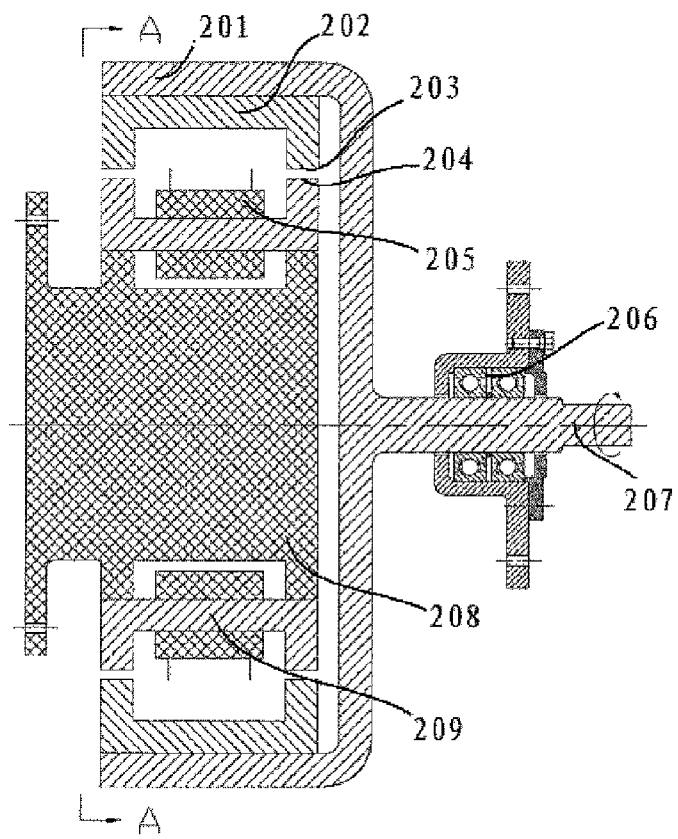
FIG. 8 is the sectional view of Embodiment 3 of this invention.
Figure 9:
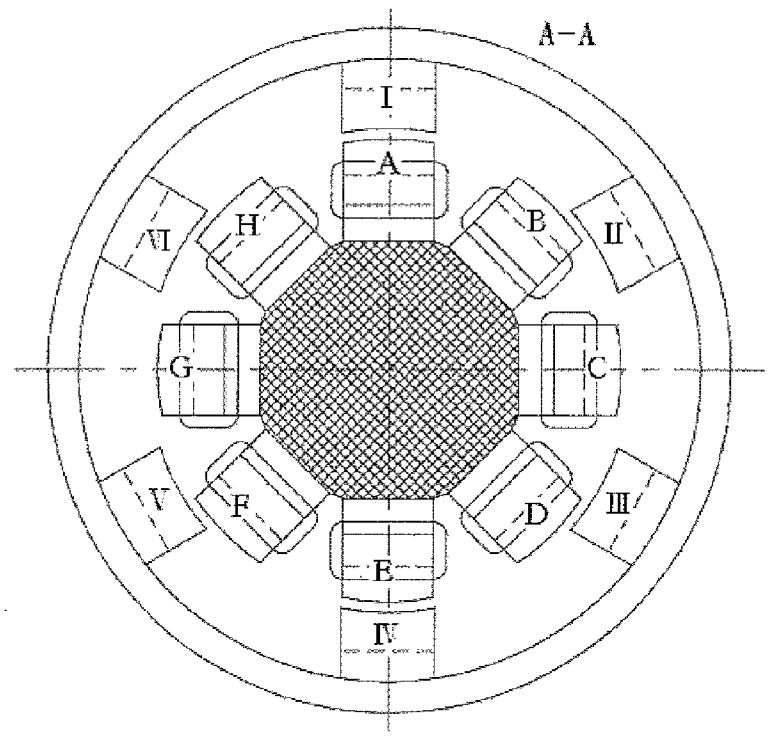
FIG. 9 is the A-A sectional view of FIG. 8 of Embodiment 3 of this invention.

The structure of the outer rotor switched reluctance motor in this embodiment is as shown in Attached FIG. 8 and Attached FIG. 9.

The rotor in this embodiment is formed by the motor external rotating housing 201 and the 6 strip-shaped doubly salient pole iron cores 202, 6 strip-shaped doubly salient pole iron cores (i.e. the 6 iron core salient pole pairs) are arranged along the motor external rotating housing inner wall annularly at equal spacing, the two salient poles of each strip-shaped doubly salient pole iron core are axially arranged, the stator of this motor is formed by the base 208 and 8 doubly salient pole iron core components wound with exciting coils, the 8 doubly salient pole iron core components wound with exciting coils (i.e. the 8 exciting salient pole pairs), with the rotating shaft as symmetric axis, are arranged radially at equal spacing around the base 208, each doubly salient pole iron core component wound with exciting coils has two salient poles 204, these two salient poles are axially arranged, and are mutually in a magnetically isolated state. The salient poles of the doubly salient pole iron core components wound with exciting coils on stator and salient poles of the rotor strip-shaped doubly salient pole iron core are arranged opposite to each other, with an air gap between them, with the rotating shaft 207 as the symmetric axis, the exciting coils of the two stator doubly salient pole iron core components wound with exciting coils at axially symmetric positions are connected in series or in parallel, and then connected as one phase to the excitation control power source.

In this embodiment, the excitation control power source supplies power to single phase of the stator one by one. When the excitation control power source supplies power to the exciting coil of stator switch component A-E phase line, a magnetic field is formed by the 4 magnetic salient poles of the stator switch components A and E, attracting the salient pole of the closest two salient poles of the rotor strip-shaped doubly salient pole iron core, to form the shortest magnetic line circuit, this magnetic torque makes the rotating shaft rotate by a given angle, when the 4 magnetic salient poles of the stator switch components A and E are just opposite to the 4 salient poles of rotor strip-shaped doubly salient pole iron core I and rotor strip-shaped doubly salient pole iron core IV, the excitation control power source immediately stops the power supply to the exciting coils of stator switch component A-E phase line, the 4 magnetic salient poles of the stator switch components A and E then cancels the acting force on the 4 salient poles of rotor strip-shaped doubly salient pole iron cores I and IV, at the same time of stopping the power supply to the exciting coil of A-E phase line, the excitation control power source supplies power to the exciting coil of stator switch component B-F phase line, the magnetic salient poles of stator switch component B-F phase line will also act on the closest salient poles of the rotor strip-shaped doubly salient pole iron core salient pole, so that the rotating shaft is rotated again by a given angle. The excitation control power source supplies power to the exciting coils of all phases of stator switch components, to keep the rotating shaft rotating. The positions of the stator and rotor in Attached FIG. 9 indicates the moment when the stator D-H phase line is just to be energized, the B-F phase line and C-G phase line are not energized and A-E phase line is just to be de-energized when the outer rotor is rotating clockwise.

In the afore-said Embodiment 1, Embodiment 2 and Embodiment 3, the following method of multi-phase simultaneous excitation control can also be adopted. In the switched reluctance motors with the structures in Embodiments 1 and 3, the exciting coil of the stator exciting salient pole pair has four phase lines, and in Embodiment 2, the exciting coil of the stator exciting salient pole pair of each individual motor also has four phase lines, when the phase lines of exciting coils of stator exciting salient pole pairs of different individual motors at identical positions are connected in parallel, there are still four phase lines connected to the excitation control power source.

Figure 10:
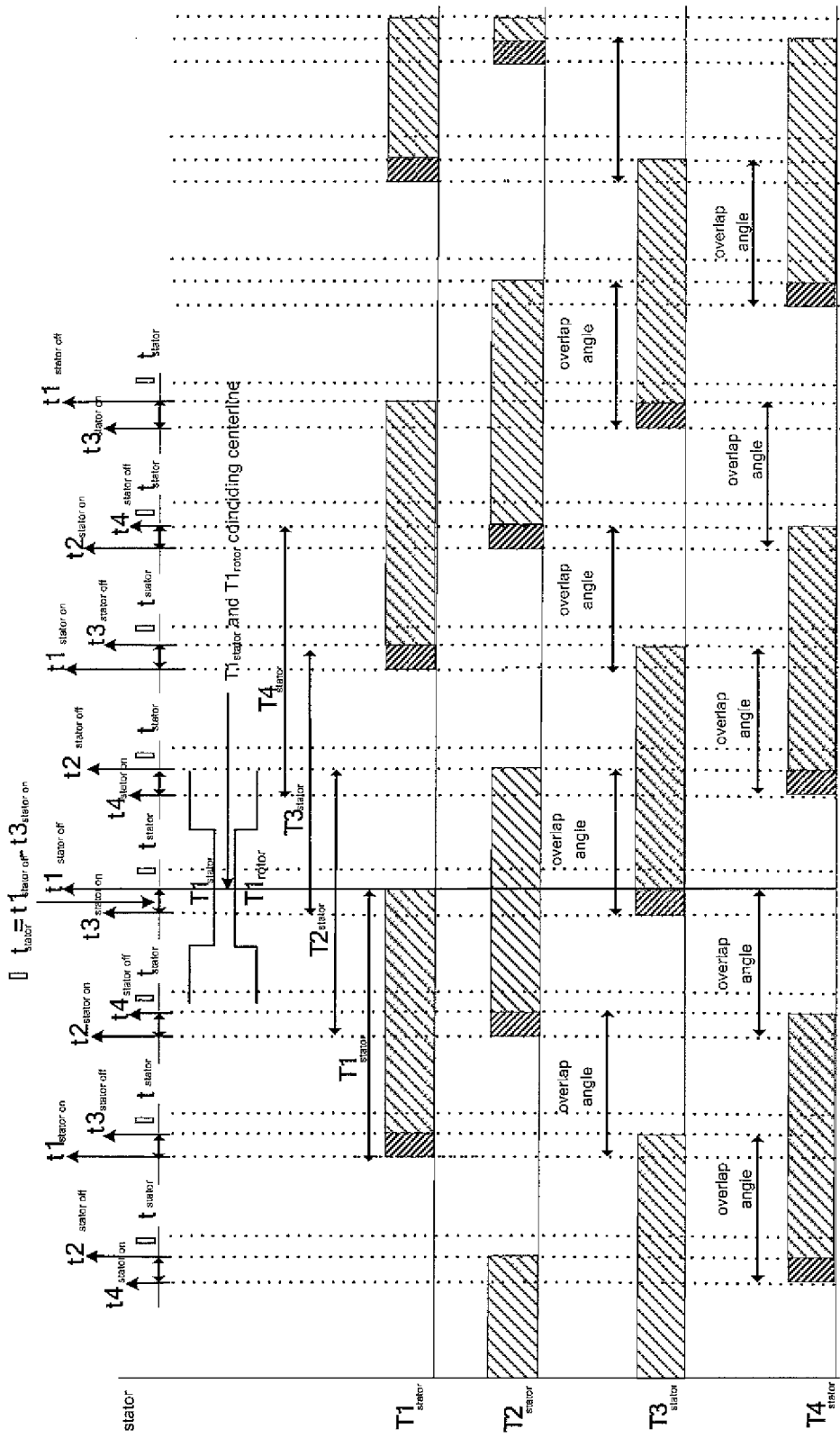
FIG. 10 is the energizing time sequence in case of "two-three phase line" electric excitation control for the stator salient pole pair exciting coils in this invention.

The excitation control power source supplies power to 4 phase lines on the stator in sequence and cyclically, Attached FIG. 10 shows the energizing time sequence for electric excitation control of the phase lines of exciting coils of stator exciting salient pole pairs. The period of the excitation control power source supplying power to phase 1 of the stator switch component (i.e. the stator exciting salient pole pair) is $T1_{stator}$, the start time of the excitation control power source supplying power to phase 1 of stator switch component is $t1_{stator\ on}$, the end time of the excitation control power source supplying power to phase 1 of stator switch component is $t1_{stator\ off}$, the period of the excitation control power source supplying power to phase 2 of stator switch component is $T2_{stator}$, the start time of the excitation control power source supplying power to phase 2 of stator switch component is $t2_{stator\ on}$, the end time of the excitation control power source supplying power to phase 2 of stator switch component is $t2_{stator\ off}$, similarly, the period of the excitation control power source supplying power to phase 4 of stator switch component is $T4_{stator}$, the start time of the excitation control power source supplying power to phase 4 of stator switch component is $t4_{stator\ on}$, the end time of the excitation control power source supplying power to phase 4 of stator switch component is $t4_{stator\ off}$, in the period $T4_{stator}$ when the excitation control power source supplies power to phase 4 of the stator switch component, the excitation control power source stops power supply to phase 3, the moment when the excitation control power source stops power supply to phase 3 is $t3_{stator\ off}$, while the moment of the excitation control power source starting the power supply to phase 1 is $t1_{stator\ on}$, moment $t1_{stator\ on}$ and moment $t3_{stator\ off}$ are both within the time period $T4_{stator}$, and between $t1_{stator\ on}$ and $t3_{off}$ there is a time difference $\Delta t_{stator}$, i.e. $\Delta t_{stator} = t3_{stator\ off} - t1_{stator\ on}$, only when $\Delta t_{stator}$ is not zero, the excitation control power source simultaneously supplies power to the exciting coils of the three adjacent phases of stator exciting salient pole pairs, when $\Delta t_{stator}$ is zero, the excitation control power source only simultaneously supplies power to the exciting coils of the two adjacent phases of stator exciting salient pole pairs, the position sensors send the position signals of stator and rotor to the excitation control power source, which controls the start and end moment of supplying power to each phase line of the stator, thus controlling the running status of the motor. The characteristic vertical line given in Attached FIG. 10 means: in the period $T2_{stator}$ when the excitation control power source supplies power to phase 2 of the stator switch component, the excitation control power source stops the power supply to phase 1, the moment of the excitation control power source stopping the power supply to phase 3 is $t1_{stator\ off}$, and the moment of the excitation control power source starting the power supply to phase 3 is $t3_{stator\ on}$, moment $t3_{stator\ on}$ and moment $t1_{stator\ off}$ are both within the period $T2_{stator}$, and between $t3_{stator\ on}$ and $t1_{off}$ there is a time difference $\Delta t_{stator}$.

Embodiment 4

The structure of the switched reluctance motor in this embodiment is similar to that of the switched reluctance motor in the afore-said Embodiment 1 (as shown in Attached FIGS. 2 and 3), with the only difference that the strip-shaped doubly salient pole iron core (i.e. iron core salient pole pairs) on the rotor is substituted by the doubly salient pole iron core component wound with exciting coils (i.e. exciting salient pole pairs).

In this embodiment, the stator is formed by 8 doubly salient pole iron core components wound with exciting coils (i.e. the 8 exciting salient pole pair), these 8 doubly salient pole iron core components wound with exciting coils are fixed symmetrically at equal spacing inside the motor housing, and the 8 doubly salient pole iron core components wound with exciting coils on the stator are mutually in a magnetically isolated state, with the protruding direction of the soft magnet salient poles in the stator doubly salient pole iron core components wound with exciting coils pointing to the motor rotating shaft. Each stator doubly salient pole iron core component wound with exciting coils has two magnetic salient poles, these two magnetic salient poles are axially distributed along the rotating shaft, the 8 components have a total of 8×2 magnetic salient poles. The rotor in this embodiment is formed by 6 doubly salient pole iron core components wound with exciting coils, these 6 doubly salient pole iron core components wound with exciting coils (i.e. the 6 exciting salient pole pairs) are fixed symmetrically at equal spacing around the rotor shaft seat, and the 6 doubly salient pole iron core components wound with exciting coils around the rotor shaft seat are mutually in a magnetically isolated state, in the 6 rotor doubly salient pole iron core components wound with exciting coils, the extruding direction of the magnetic salient poles point in the radial direction of the rotating shaft, the 6 rotor components have 6×2 magnetic salient poles, with each two magnetic salient poles as one group, each group of two salient poles are axially distributed along the rotating shaft, the magnetic salient poles of the stator doubly salient pole iron core components wound with exciting coils and the magnetic salient poles of the rotor doubly salient pole iron core components wound with exciting coils are arranged opposite to each other, with a minimal air gap between them. The exciting coils of the 8 doubly salient pole iron core components wound with exciting coils of the motor stator are connected in series or in parallel two by two, forming a total of 4 phase lines, i.e. the exciting coils of stator component A and component E are connected in series or in parallel, the exciting coils of stator component B and component F are connected in series or in parallel, the exciting coils of stator component C and component G are connected in series or in parallel, and the exciting coils of stator component D and component H are connected in series or in parallel, forming four phase lines, i.e. stator A-E phase line, stator B-F phase line, stator C-G phase line and stator D-H phase line. The exciting coils of the 6 doubly salient pole iron core components wound with exciting coils of the motor rotor are also connected in series or in parallel two by two, i.e. the exciting coil of the rotor doubly salient pole iron core component wound with exciting coil I is connected in series or in parallel with that of the doubly salient pole iron core component wound with exciting coil IV, the exciting coil of the rotor doubly salient pole iron core component wound with exciting coil II is connected in series or in parallel with that of the doubly salient pole iron core component wound with exciting coil V, and the exciting coil of the rotor doubly salient pole iron core component wound with exciting coil III is connected in series or in parallel with that of the doubly salient pole iron core component wound with exciting coil VI, forming a total of three phase lines, i.e. rotor I-IV phase line, rotor II-V phase line and rotor III-VI phase line. The four phase lines of the stator and the three phase lines of the rotor are respectively supplied with power by the excitation control power source in specified time sequence.

An electric excitation method for the stator and rotor in this embodiment is: the excitation control power source provides excitation electric energy to one phase line of the stator and one phase lines of the rotor simultaneously in sequence cyclically.

Embodiment 5

The structure of the switched reluctance motor in this embodiment is similar to that of the switched reluctance motor in the Embodiment 2 (as shown in Attached FIG. 4), with the only difference that the strip-shaped doubly salient pole iron core (i.e. iron core salient pole pairs) on the rotor is substituted by the doubly salient pole iron core component wound with exciting coils (i.e. exciting salient pole pairs).

Three individual motors share one rotating shaft. The radial centerlines of the iron core magnetic salient poles of the doubly salient poles wound with exciting coils (i.e. exciting salient pole pairs) on the stator of the three individual motors coincide completely, with no radial angular difference, while the radial centerlines of the iron core magnetic salient poles of the doubly salient poles wound with exciting coils (i.e. exciting salient pole pairs) on the rotors of the three individual motors are provided with an angular difference $\alpha$ of 5° mutually between them (refer to Attached FIG. 5, Attached FIG. 6, and Attached FIG. 7). In this embodiment, the three individual motors are arranged on the same rotating shaft to form a combined switched reluctance motor in three layers of front, middle and rear, in this structure, the method of setting axial angular difference is used to replace the method for traditional switched reluctance motors of increasing the number of magnetic pole pairs radially to realize limited division of step angle, so that the combined switched reluctance motor can on one hand suppress the pulsation of motor output torque and realize more stable transition of output torque, and on the other hand, the fine division of conducting angles can further reduce the step angles of stator and rotor, or reducing the angles of the step motor, thus laying the foundation for precision control of motors.

For the combined switched reluctance motor given in this embodiment, an electric excitation method of the excitation control power source is: each individual motor supplies power to a single phase of the stator and a single phase of the rotor in sequence and cyclically, but there is a fixed time difference between the power supply moment for the corresponding phase lines (i.e. phase 1 $(A-E)_1$ of the front individual motor and phase 1 $(A-E)_2$ of the middle individual motor and phase 1 $(A-E)_3$ of the rear individual motor are the corresponding phase lines) on the stators of different individual motors, and there is a fixed time difference between the power supply moment for the corresponding phase lines (i.e. phase 1 $(I\ IV)_1$ of the front individual motor and phase 1 $(I\ IV)_2$ of the middle individual motor and phase 1 $(I\ IV)_3$ of the rear individual motor are the corresponding phase lines) on the rotors of different individual motors, the power supply time difference of corresponding phase lines of stators and rotors of different individual motors is associated with the rotating angle $\alpha$ between the rotor radial centerlines of different individual motors. The position sensors provided on the motor stators and rotors send the stator and rotor positions signals to the excitation control power source, which controls the start and end moment of supplying power to the stator phase lines of the three individual motors, thus controlling the running status of the three individual motors.

In the afore-said Embodiment 4 and Embodiment 5, the following method of multi-phase simultaneous excitation control can also be adopted. In the switched reluctance motors with the structures in Embodiment 4, the exciting coil of the stator exciting salient pole pair has four phase lines, and the exciting coil of the rotor exciting salient pole pair has three phases; in Embodiment 5, the exciting coil of the stator exciting salient pole pair of each individual motor also has four phase lines, when the phase lines of exciting coils of stator exciting salient pole pairs of different individual motors at identical positions are connected in parallel, there are still four phase lines connected to the excitation control power source, the exciting coil of the rotor exciting salient pole pair of an individual motor also has three phase lines, and when the phase lines of the exciting coils of the rotor exciting salient pole pairs of different individual motors are connected in parallel, there are still three phase lines connected to the excitation control power source.

Figure 11:
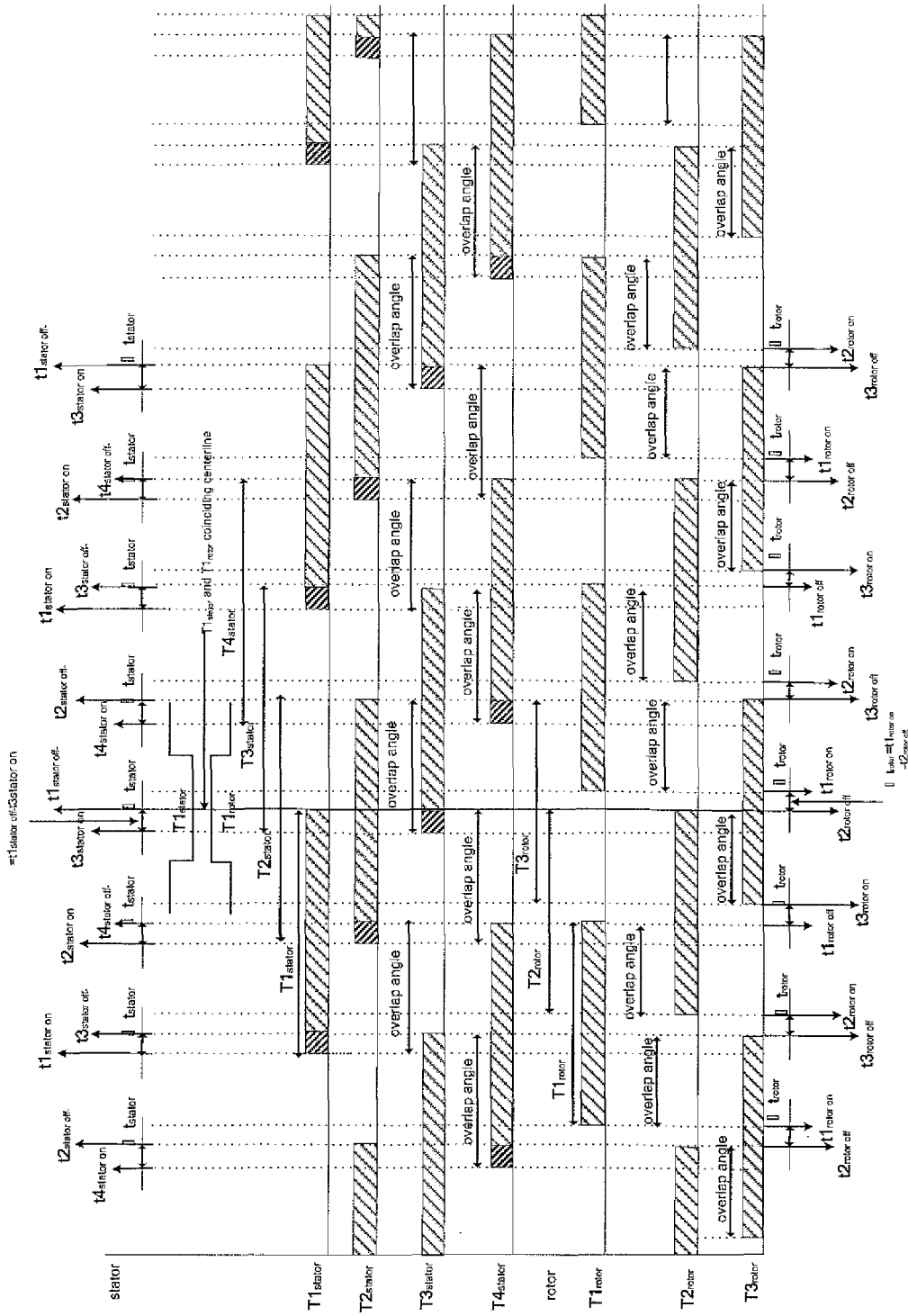
FIG. 11 is the energizing time sequence in case of two-phase line electric excitation for both stator and rotor in Embodiments 4 and 5 of this invention.

The excitation control power source supplies power to the four phase lines on the stator in sequence and cyclically, meanwhile, the excitation control power source also supplies power to the three phase lines on the rotor in sequence and cyclically, FIG. 11 shows the energizing sequence diagram in case of electric excitation of all pairs of phase lines of stators and rotors in Embodiment 4 and Embodiment 5. The period of the excitation control power source supplying power to stator phase 1 is $T1_{stator}$, the start time of the excitation control power source supplying power to stator phase 1 is $t1_{stator\ on}$, the end time of the excitation control power source supplying power to stator phase 1 is $t1_{stator\ off}$, the period of the excitation control power source supplying power to stator phase 2 is $T2_{stator}$, the start time of the excitation control power source supplying power to stator phase 2 is $t2_{stator\ on}$, the end time of the excitation control power source supplying power to stator phase 2 is $t2_{stator\ off}$, similarly, the period of the excitation control power source supplying power to stator phase 4 is $T4_{stator\ on}$, the start time of the excitation control power source supplying power to stator phase 4 is $t4_{stator\ on}$, the end time of the excitation control power source supplying power to stator phase 4 is $t4_{stator\ off}$, in the period $T4_{stator}$ when the excitation control power source supplies power to stator phase 4, the excitation control power source stops the power supply to phase 3, the moment when the excitation control power source stops the power supply to phase 3 is $t3_{stator\ off}$, while the moment of the excitation control power source starts the power supply to phase 1 is $t1_{stator\ on}$, moment $t1_{stator\ on}$ and moment $t3_{stator\ off}$ are both within $T4_{stator}$, and between $t1_{stator\ on}$ and $t3_{stator\ off}$, there is a time difference $\Delta t_{stator}$, $\Delta t_{stator}=t3_{stator\ off}-t1_{stator\ on}$, only when $\Delta t_{stator}$ is not zero, i.e. between the moment $t1_{stator\ on}$ and moment $t3_{stator\ off}$, the excitation control power source simultaneously supplies power to the three adjacent phases of the stator exciting coils, when $\Delta t_{stator}$ is zero, the excitation control power source only simultaneously supplies power to the two adjacent phases of stator exciting coils; similarly, the excitation control power source supplies power to the three phase lines on the rotor in sequence and cyclically, i.e. the period of the excitation control power source supplying power to rotor phase 1 is $T1_{rotor}$, the start time of the excitation control power source supplying power to rotor phase 1 is $t1_{rotor\ on}$, the end time of the excitation control power source supplying power to rotor phase 1 is $t1_{rotor\ off}$, the period of the excitation control power source supplying power to rotor phase 2 is $T2_{rotor}$, the start time of the excitation control power source supplying power to rotor phase 2 is $t2_{rotor\ on}$, the end time of the excitation control power source supplying power to rotor phase 2 is $t2_{rotor\ off}$, the period of the excitation control power source supplying power to rotor phase 3 is $T3_{rotor}$, the start time of the excitation control power source supplying power to rotor phase 3 is $t3_{rotor\ on}$, the end time of the excitation control power source supplying power to rotor phase 3 is $t3_{rotor\ off}$, in the period $T3_{rotor}$ when the excitation control power source supplies power to rotor phase 3, the excitation control power source stops the power supply to phase 2, the moment when the excitation control power source stops the power supply to phase 2 is $t2_{rotor\ off}$, while the moment when the excitation control power source starts the power supply to phase 1 is $t1_{rotor\ on}$, moment $t1_{rotor\ on}$ and moment $t2_{rotor\ off}$ are both within $T3_{rotor}$, and between $t2_{rotor\ off}$ and $t1_{rotor\ on}$, there is a time difference $\Delta t_{rotor}$, $\Delta t_{rotor}=t1_{rotor\ on}-t2_{rotor\ off}$, when $\Delta t_{rotor}$ not zero, i.e. between the moment $t1_{rotor\ on}$ and moment $t2_{rotor\ off}$, the excitation control power source supplies power to the same phase of the rotor exciting coil, during other time periods, the excitation control power source simultaneously supplies power to two phases of the rotor exciting coils, the position sensor sends stator and rotor position signal to the excitation control power source, which controls the start and end time of supplying power to various phase lines of the motor stator and rotor, thus controlling the running status of the motor.

Embodiment 6

Figure 12:
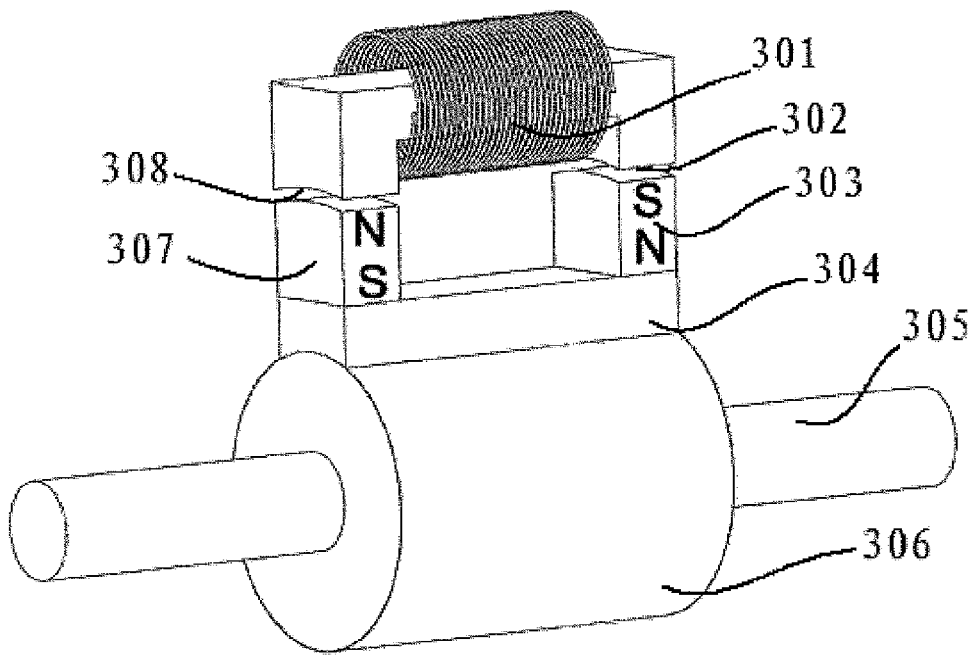
FIG. 12 is the structural schematic diagram of the axial arrangement of the stator exciting salient pole pair and rotor permanent magnet salient pole pair in Embodiment 6 of this invention.
Figure 13:
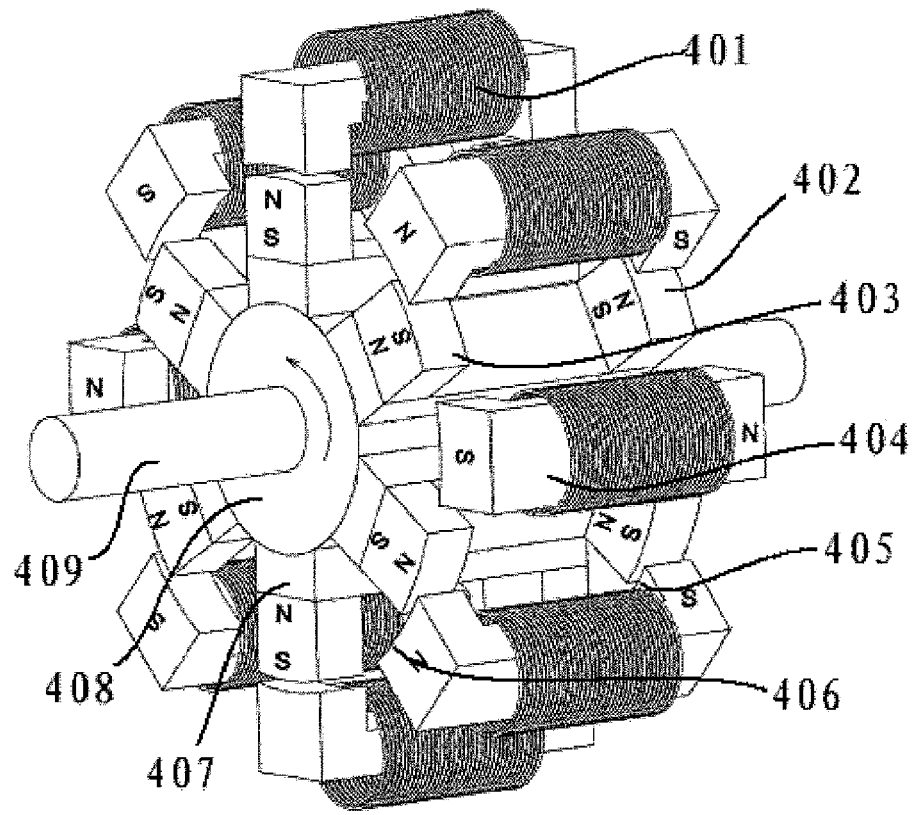
FIG. 13 is the schematic diagram of the space structure of Embodiment 6 of this invention.
Figure 14:
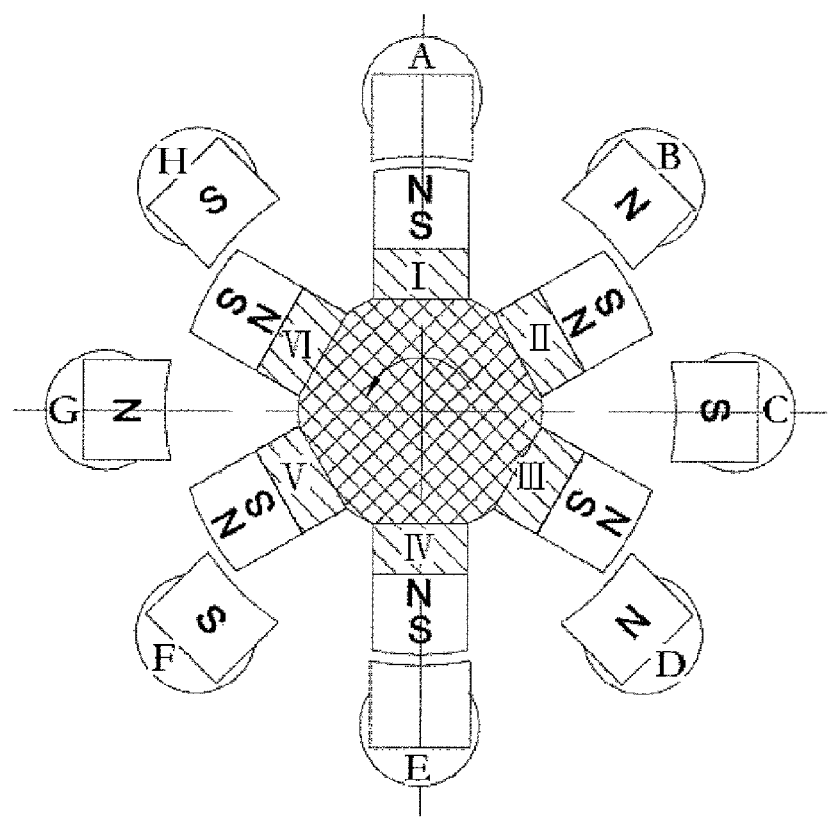
FIG. 14 is the sectional view of Embodiment 6 of this invention.

In this embodiment, there are 8 stator exciting salient pole pairs, and 6 rotor permanent magnet salient pole pairs, the two salient poles of the stator exciting salient pole pair and the two salient poles of the rotor permanent magnet salient pole pairs are all axially arranged, as shown in Attached FIG. 12, Attached FIG. 13 and Attached FIG. 14.

In this embodiment, the 8 stator exciting salient pole pairs, with the rotating shaft axial line as symmetric axis, are fixed symmetrically at equal spacing on the non-magnet conducting cylinder inner wall, and the two salient poles 405 and 406 of each stator exciting salient pole pair are axially arranged along the rotating shaft 409, while the 6 rotor permanent magnet salient pole pairs, with the rotating shaft axial line as symmetric axis, fixed symmetrically at equal spacing on the non-magnet conducting rotor base 408, and the two salient poles 402 and 403 of each rotor permanent magnet salient pole pair are axially arranged along the rotating shaft. Both design and assembling should ensure consistent axial positions for the salient poles of the rotor permanent magnet salient pole pair and the salient poles of the stator exciting salient pole pair, i.e. the vertical plane of the salient poles of the stator exciting salient pole pair should coincide with the rotating vertical plane of the salient poles of the rotor permanent magnet salient pole pair, stator exciting salient pole pair A and stator exciting salient pole pair E form a group, stator exciting salient pole pair B and stator exciting salient pole pair F form a group, stator exciting salient pole pair C and stator exciting salient pole pair G form a group, stator exciting salient pole pair D and stator exciting salient pole pair H form a group, and the two exciting coils of each group of stator exciting salient pole pairs are connected in series or in parallel, in this way, the magnetic polarity of each group of stator exciting salient pole pairs can change simultaneously. With this arrangement, by respectively changing the current direction inputting into the exciting coils of the four groups of stator exciting salient pole pairs, the magnetic polarity of the salient poles of the eight stator exciting salient pole pairs can be controlled separately.

Figure 18:
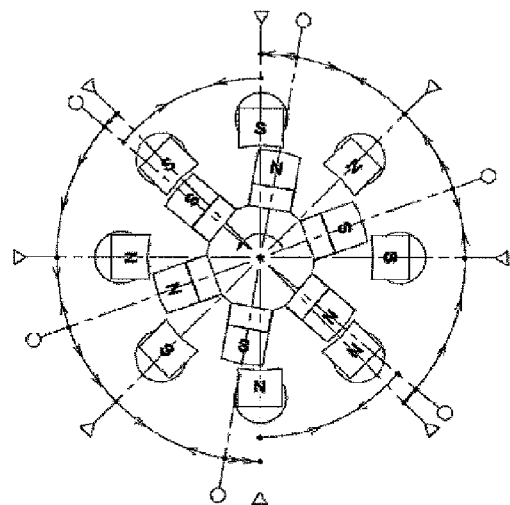
FIG. 18 is the acting force schematic diagram of stator and rotor at relative position I in Embodiments 6 and 7 of this invention.

The interaction of the stator and rotor in this embodiment is described with the following three characteristic positions:

First, as shown in Attached FIG. 18, no salient pole radial centerline of stator exciting salient pole pairs coincide with that of the rotor permanent magnet salient pole pairs, so in this state, all stator exciting salient pole pairs exert magnetic acting force to their nearby rotor permanent magnet salient pole pairs.

Figure 19:
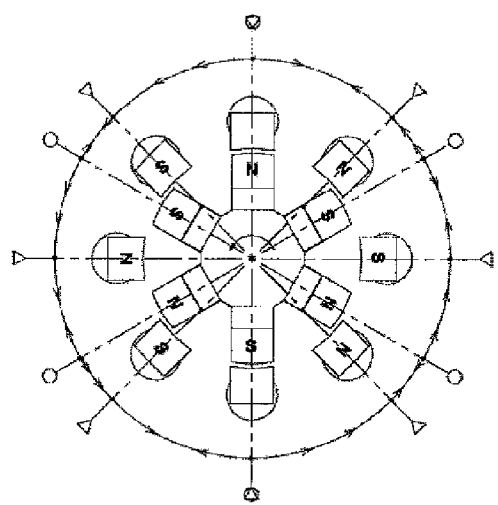
FIG. 19 is the acting force schematic diagram of stator and rotor at relative position II in Embodiments 6 and 7 of this invention.

Second, as shown in Attached FIG. 19, the salient pole radial centerline of stator exciting salient pole pair A and the salient pole radial centerline of rotor permanent magnet salient pole pair I coincide, and the salient pole radial centerline of stator exciting salient pole pair E and the salient pole radial centerline of rotor permanent magnet salient pole pair IV coincide (for the codes describing the positions of exciting salient pole pairs and positions of permanent magnet salient pole pairs in the attached figures, refer to Attached FIG. 14), the shortest enclosed magnetic circuit is formed between the stator exciting salient pole pair A and rotor permanent magnet salient pole pair I, and between the stator exciting salient pole pair E and rotor permanent magnet salient pole pair IV, at this moment, the position sensors respectively provided on the stator and rotor output signals, which make the excitation control power source transiently change the current in the exciting coils in stator exciting salient pole pair A and stator exciting salient pole pair E, first, the exciting current is reduced to zero transiently, and when the rotor permanent magnet salient pole pairs I and IV deviate from the stator exciting salient pole pairs A and E by about 2 to 5 degrees, the excitation control power source changes the current direction in the exciting coils of the stator exciting salient pole pair A and E. In Attached FIG. 19, the stator exciting salient pole pair B and stator exciting salient pole pair F not only produce a magnetic repelling force against rotor permanent magnet salient pole pair I and rotor permanent magnet salient pole pair IV, but also produce a magnetic attracting force on the rotor permanent magnet salient pole pair II and rotor permanent magnet salient pole pair V, the stator exciting salient pole pair C and stator exciting salient pole pair G not only produce a magnetic repelling force against permanent magnet salient pole pair II and rotor permanent magnet salient pole pair V, but also produce a magnetic attracting force on the rotor permanent magnet salient pole pair III and rotor permanent magnet salient pole pair VI, and the stator exciting salient pole pair D and stator exciting salient pole pair H produce a magnetic repelling force against rotor permanent magnet salient pole pair III and rotor permanent magnet salient pole pair VI.

Figure 20:
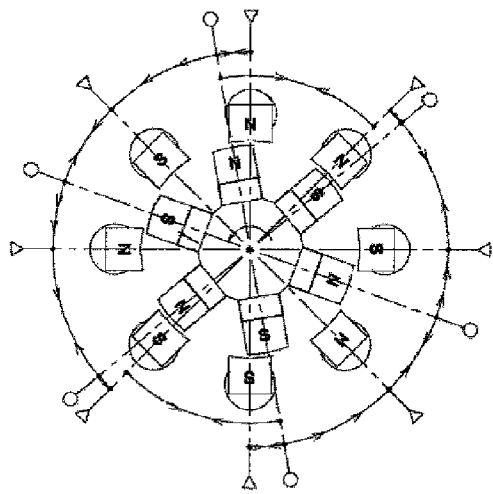
FIG. 20 is the acting force schematic diagram of stator and rotor at relative position III in Embodiments 6 and 7 of this invention.

Third, as shown in Attached FIG. 20, after the rotor further rotates by about 3 degrees, the magnetic polarity of the salient pole of the stator exciting salient pole pair A changes from the previous S pole to N pole, the magnetic polarity of the salient pole of the stator exciting salient pole pair E changes from the previous N pole to S pole, so that the stator exciting salient pole pair A and stator exciting salient pole pair E start to produce an expelling force against the rotor permanent magnet salient pole pair and rotor permanent magnet salient pole pair IV, in the description above, the codes of the exciting salient pole pairs and permanent magnet salient pole pairs are as referred to in Attached FIG. 14.

When stator A and stator E experience the afore-said three steps of magnetic pole changes, the other stator exciting salient pole pairs still maintain the magnetic acting force on their nearby rotor permanent magnet salient pole pairs, until the salient pole radial centerline of the rotor permanent magnet salient pole pair II coincides with the salient pole radial centerline of the stator exciting salient pole pair B, and the salient pole radial centerline of the rotor permanent magnet salient pole pair V coincides with the salient pole radial centerline of the stator exciting salient pole pair F, at this moment, the position sensors provided between the stator and rotor output signals again to the excitation control power source, first, the exciting current in the exciting coils of the stator exciting salient pole pair B and stator exciting salient pole pair F is reduced to zero transiently, and right after, the exciting current direction is changed. The stator exciting salient pole pair B and stator exciting salient pole pair F repeat the previous process of the stator exciting salient pole pair A and stator exciting salient pole pair E, and this process is repeated cyclically. The position sensors provided between the stator and rotor can ensure that they will output signal to the excitation control power source once the salient pole radial centerline of a rotor permanent magnet salient pole pair coincides with the salient pole radial centerline of a stator exciting salient pole pair, and the excitation control power source will then first reduce the current in the stator exciting coils with coincided radial centerlines transiently to zero, and right after change the current direction.

The relative position state of the stator and rotor as shown in Attached FIG. 19 indicates that, except the stator exciting salient pole pair A and stator exciting salient pole pair E that have no rotating force on the rotor permanent magnet salient pole pair I and rotor permanent magnet salient pole pair IV, all other exciting salient pole pairs produce magnetic rotating force on the nearby permanent magnet salient pole pairs. In view of the time of doing work, the time period of the shortest magnetic circuit formed with the salient poles of the stator exciting salient pole pair and the salient poles of the rotor permanent magnet salient pole pair "strictly opposite" is extremely short, while the time of doing work with the other stator exciting salient pole pairs and rotor permanent magnet salient pole pairs acting on one another is relatively much longer. More mutually acting points between the stator and rotor and longer interaction time are the basis in this embodiment to obtain greater continuous torque and higher output power density for the motor.

Figure 23:
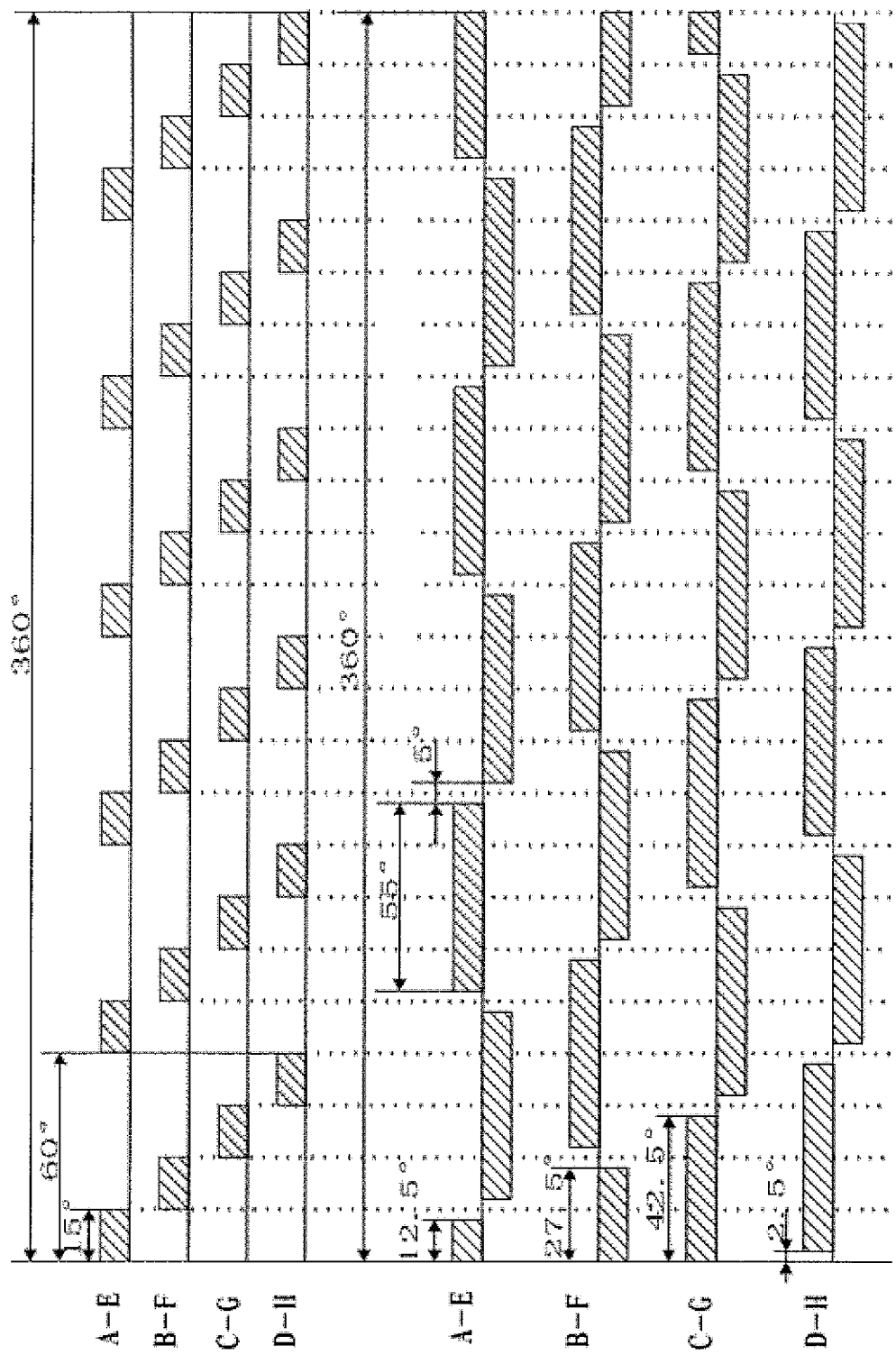
FIG. 23 is the comparison diagram of energizing time sequence of all phase lines in Embodiments 6, 7 and 9 of this invention with the energizing time sequence of all phase lines in traditional "8 to 6" switched reluctance motor

The structure advantages and excitation control method of the permanent magnet switched reluctance motor in this embodiment can realize greater continuous torque and output power density, which can also be demonstrated in the comparison of the time sequence diagram of the current applied to all phase lines of the permanent magnet switched reluctance motor in this embodiment and the time sequence diagram of the current applied to all phase lines of a traditional doubly salient switched reluctance motor, refer to Attached FIG. 23.

The upper part of Attached FIG. 23 is the energizing time sequence diagram of a traditional "8 to 6" doubly salient switched reluctance motor. When a single phase is conducting, for a "8/6 pole" four-phase switched reluctance motor, it is known that its conducting angle is 15°, when a salient pole of the rotor coincides with the stator salient pole, the subsequent or previous phase conducts, or commutation takes place, and the phase will not conduct until the next commutation for this phase. For a traditional "8 to 6 poles" switched reluctance motor, the conducting angle of a single phase when the rotor rotates a revolution (or 360°) is:

$$\theta_A(on)=\theta_B(on)=\theta_c(on)=\theta_D(on)=90°$$

$$\theta_A(off)=\theta_B(off)=\theta_c(off)=\theta_D(off)=270°$$

This shows that the coil conducting angle of the traditional "8 to 6 poles" switched reluctance motor is small.

The lower part of Attached FIG. 23 is the energizing time sequence diagram of the permanent magnet switched reluctance motor of this embodiment.

For the permanent magnet switched reluctance motor in this embodiment, the conducting angle of a single phase when the rotor rotates a revolution (or 360°) is:

$$\theta_A(on)=\theta_B(on)=\theta_c(on)=\theta_D(on)=330°$$

$$\theta_A(off)=\theta_B(off)=\theta_c(off)=\theta_D(off)=30°$$

This shows that the coil conducting angle of the permanent magnet switched reluctance motor of this embodiment is quite large.

Now compare their total conducting angle.

For a traditional "8 to 6 poles" switched reluctance motor, its total conducting angle when the rotor rotates a revolution (or 360°) is:

$$\theta_{total}(on)=\theta_A(on)+\theta_B(on)+\theta_c(on)+\theta_D(on)+360°$$

$$\theta_{total}(off)=\theta_A(off)+\theta_B(off)+\theta_c(off)+\theta_D(off)+1080°$$

This shows that the total conducting angle of a traditional "8 to 6 poles" switched reluctance motor is equal to the angle of the rotor rotating a revolution, and the off angle is very large, therefore, the utilization rate of the excitation control power source and the electromagnetic conversion parts in the motor is low, and the motor jitters seriously when running, with low output torque.

For the permanent magnet switched reluctance motor in this embodiment, its total conducting angle when the rotor rotates a revolution (or 360°) is:

$$\theta_{total}(on)=\theta_A(on)+\theta_B(on)+\theta_c(on)+\theta_D(on)+1320°$$

$$\theta_{total}(off)=\theta_A(off)+\theta_B(off)+\theta_c(off)+\theta_D(off)+120°$$

This shows that the total conducting angle of the permanent magnet switched reluctance motor in this embodiment is very large, therefore its power to volume ratio, output torque and torque stability are much better than those of the traditional switched reluctance motors.

Embodiment 7

Figure 15:
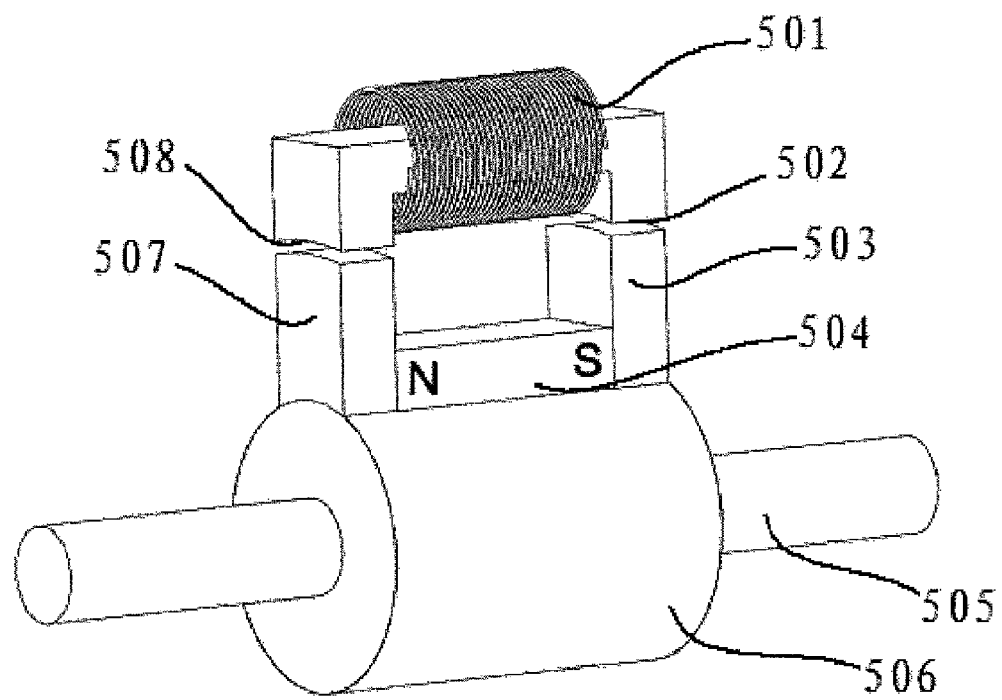
FIG. 15 is the structural schematic diagram of the axial arrangement of the stator exciting salient pole pair and rotor permanent magnet salient pole pair in Embodiment 7 of this invention.
Figure 16:
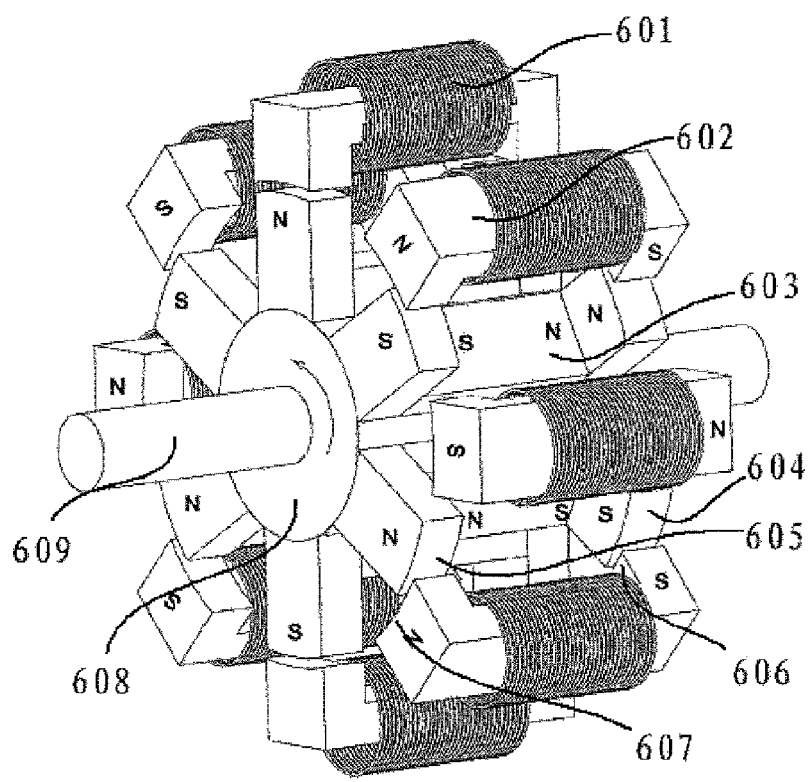
FIG. 16 is the schematic diagram of the space structure of Embodiment 7 of this invention.
Figure 17:
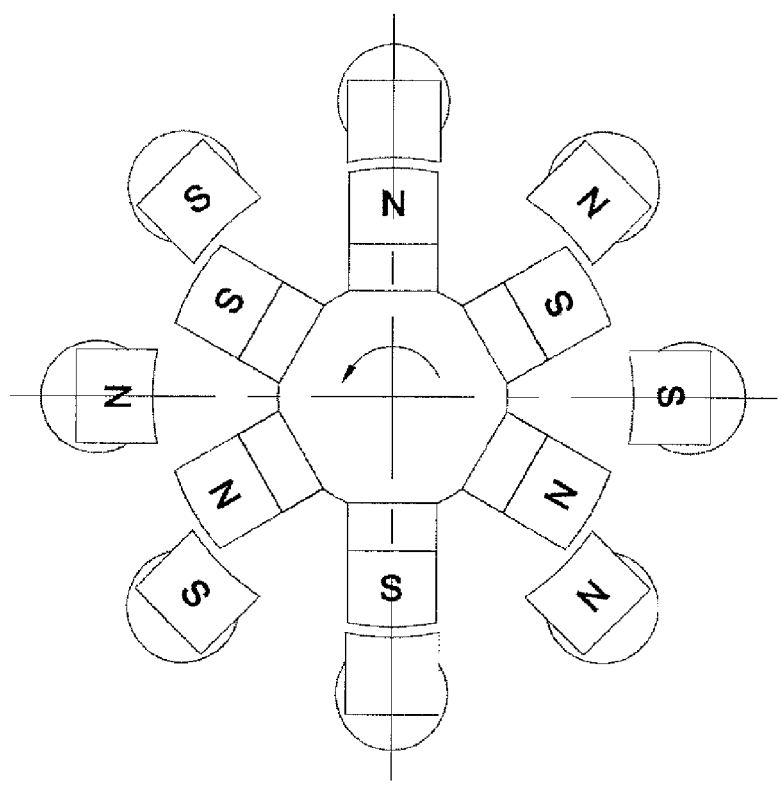
FIG. 17 is the sectional view of Embodiment 7 of this invention.

The structure of this embodiment is basically identical to that of Embodiment 6, as shown in Attached FIG. 15, Attached FIG. 16 and Attached FIG. 17. The only difference is in the structure of the rotor permanent magnet salient pole pairs, in this embodiment, the rotor permanent magnet salient pole pair is formed by permanent magnet 504 and two soft magnet materials 503 and 507.

The structure features and excitation control method of this embodiment are the same as those in Embodiment 6, and will not be repeated here.

Embodiment 8

This embodiment is the combined structure form of switched reluctance motor in Embodiment 6 or Embodiment 7, the structure of this embodiment is similar to those in Attached FIGS. 4, 5, 6 and 7, with the only difference that a rotor permanent magnet salient pole pair is used in place of the rotor iron core salient pole pair.

In this embodiment, as in Embodiment 6 or Embodiment 7, eight stator exciting salient pole pairs and six rotor permanent magnet salient pole pairs form an individual motor, the rotating shafts of three such individual motors are axially connected, and the stator exciting salient pole pairs of the three individual motor are at completely identical position in radial space, i.e. the radial centerlines of salient poles of the exciting salient pole pairs of different individual motor stator coincide, and between the radial centerlines of salient poles of permanent magnet salient pole pairs at corresponding positions of different individual motor rotors, the rotating angle around the rotating shaft in sequence in the same direction is 5 degrees. Attached FIG. 5 shows the sectional view of the individual motor at the front most, Attached FIG. 6 shows the sectional view of the individual motor in the middle, and Attached FIG. 7 shows the sectional view of the individual motor at the rear most. In the figures, the angle α is the rotating angle set between the radial centerlines of salient poles of rotor permanent magnet salient pole pairs of different individual motors, and α is 5 degrees. The three individual motors so arranged have realized the fine division of step angles of individual motors. The stator exciting coils in each layer of individual motor are controlled by 4 phase lines of excitation power source, between the stator and rotor of individual motor in each layer is provided with a position sensor, as long as there is a salient pole radial centerline of stator exciting salient pole pair coinciding with the salient pole radial centerline of rotor permanent magnet salient pole pair in a layer (as in Attached FIG. 5, the salient pole radial centerlines of stator exciting salient pole pair A (1) and E (1) coincide with the salient pole radial centerlines of rotor permanent magnet salient pole pair I (1) and IV (1)), the position sensor of that layer will output a signal, to control the excitation power source to first reduce the exciting current in the exciting coils of stator exciting salient pole pair A (1) and E (1) to zero, and then change the current direction, to change the magnetic polarity of the salient poles of stator exciting salient pole pairs A (1) and E (1). In this embodiment, the individual motors in three layers works independently and in sequence, so that at any angle the rotor in this embodiment rotates, there are a number of phase lines in the individual motors of three layers being supplied with power to produce a continuous rotating torque, this arrangement has further increase the motor output power and divided step angles, achieving the effect of steady start and running.

Embodiment 9

Figure 21:
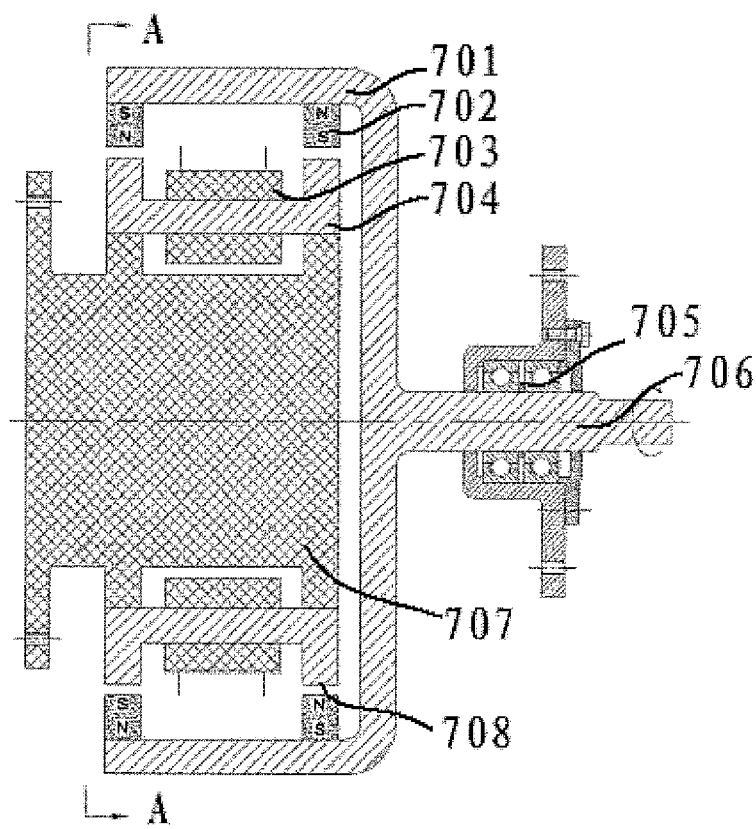
FIG. 21 is the sectional view of Embodiment 9 of this invention.
Figure 22:
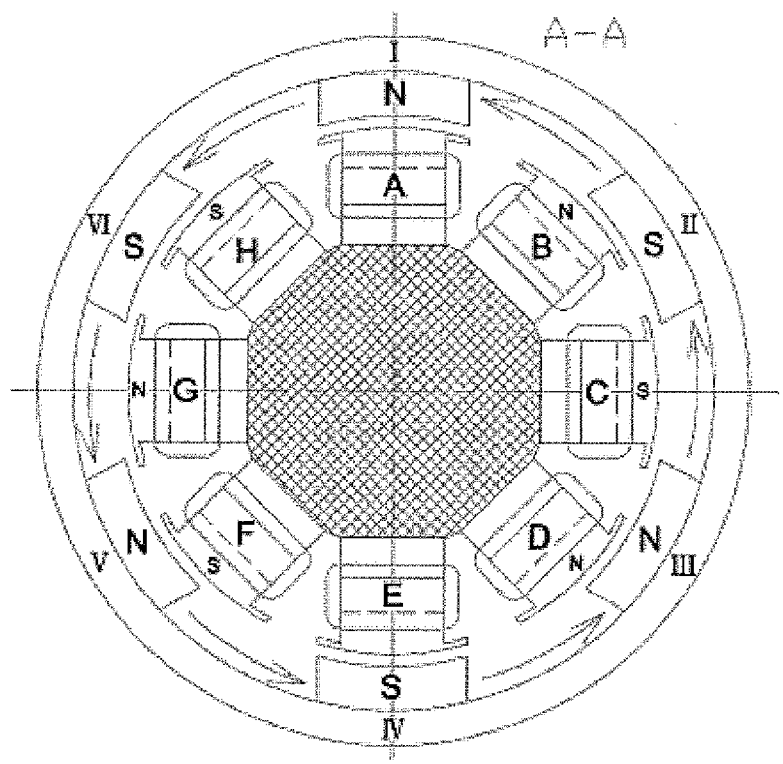
FIG. 22 is the A-A sectional view of FIG. 21 of Embodiment 9 of this invention.

This embodiment is about an outer rotor switched reluctance motor with the salient poles of the stator exciting salient pole pairs and of rotor permanent magnet salient pole pairs arranged axially, the structure is as shown in Attached FIG. 21 and Attached FIG. 22.

In this embodiment, the rotor is formed by the magnet conducting rotating housing 701 and 12 permanent magnets 702, the 12 permanent magnets are divided into 6 groups, with two permanent magnets as one group, the S pole of a permanent magnet is connected to the magnet conducting rotating housing 701, the N pole of the other permanent magnet is connected to the magnet conducting rotating housing 701, the two permanent magnets in each group are axially arranged along the rotating shaft, the two permanent magnets of each group, via the magnet conducting rotating housing, form a permanent magnet salient pole pair, the 12 permanent magnets, with two as a group, form 6 permanent magnet salient pole pairs, these 6 permanent magnet salient pole pairs are arranged along the motor external rotating housing inner wall annularly at equal spacing, and the salient poles of the adjacent permanent magnet salient pole pairs are in opposite magnetic polarity. In the motor of this embodiment, the stator is formed by the base 707 and 8 stator exciting salient pole pairs, the 8 exciting salient pole pairs, with the rotating shaft as symmetric axis, are arranged radially at equal spacing around the base 707, and are mutually in a magnetically isolated state, each exciting salient pole pair has two salient poles 708, and these two salient poles are also axially arranged. The salient poles of the exciting salient pole pairs on the stator and salient poles of the permanent magnet salient pole pairs on the rotor are arranged opposite to each other, with an air gap between them. The 8 stator exciting salient pole pairs are arranged with the rotating shaft 706 as symmetric axis, the exciting coils 703 of the two stator exciting salient pole pairs at axially symmetric positions are connected in series or in parallel, and are supplied and controlled by one phase of exciting current, in this way, the 8 stator exciting salient pole pairs are supplied and controlled by four phases of exciting current.

In this embodiment, before the salient pole radial centerline of a stator exciting salient pole pair coincides with the salient pole radial centerline of a closest rotor permanent magnet salient pole pair, the exciting coil of that stator exciting salient pole pair is applied with a forward exciting current, so that the salient poles of that stator exciting salient pole pair produce a magnetic attracting force on the salient poles of the closest rotor permanent magnet salient pole pair, once the salient pole radial centerline of that stator exciting salient pole pair coincides with the salient pole radial centerline of the closest rotor permanent magnet salient pole pair, the position sensor provided between the stator and rotor outputs a signal, which triggers the excitation control power source, the excitation control power source transiently reduces the exciting current in the exciting coil of that stator exciting salient pole pair to zero, and right after it is applied with a reverse exciting current, so that this stator exciting salient pole produces a magnetic pushing force on the closest rotor permanent magnet salient pole pair, and in the short time period when the salient pole radial centerline of the afore-said stator exciting salient pole pair and the radial centerline of the closest rotor permanent magnet salient pole pair experience from non-coinciding to coinciding and then from coinciding to non-coinciding again, the excitation control power source applies forward or reverse exciting current to the exciting coils of the stator exciting salient pole pair of the other three phases, these stator exciting salient pole pairs maintain the magnetic attracting force and magnetic pushing force on their nearby rotor permanent magnet salient pole pairs, until the salient pole radial centerline of another stator exciting salient pole pair and the salient pole radial centerline of another closest rotor permanent magnet salient pole pair coincide, and this process goes on cyclically, to keep the rotor rotating. As shown in Attached FIG. 22, the rotor rotates counterclockwise, once the salient pole radial centerlines of the exciting salient pole pairs A and E on the stator and the salient pole radial centerlines of the permanent magnet salient pole pairs I and IV on the rotor coincide, the excitation control power source transiently reduces the previous reverse current supplied to the phase lines of stator exciting salient pole pairs A and E to zero current, and right after it changes the current as forward, in Attached FIG. 22, the magnetic polarity of the salient pole of the stator exciting salient pole pair A changes from S to N, the magnetic polarity of the salient pole of the stator exciting salient pole pair E changes from N to S, the magnetic rotation attracting force produced by the salient poles of exciting salient pole pairs A and E on the stator on the salient poles of the permanent magnet salient pole pairs I and IV on the rotor disappears, and right after a magnetic pushing force is produced, in the period of stator exciting salient pole pairs changes the power supply direction, the excitation control power source maintains the forward current to the phase lines of the exciting salient pole pairs B and F on the stator, so that the salient poles of the exciting salient pole pairs B and F on the stator maintain the magnetic attractive pulling force on the salient poles of the permanent magnet salient pole pairs II and V on the rotor, still in this period, the excitation control power source maintains the supply of reverse current to the phase lines of exciting salient pole pairs C and G on the stator, so that the salient poles of the exciting salient pole pairs C and G on the stator not only produce a magnetic pushing force on the salient poles of the permanent magnet salient pole pairs II and V on the rotor, but also concurrently produce a magnetic attracting force on the salient poles of the rotor permanent magnet salient pole pairs III and VI, still in this period, the excitation control power source maintains the supply of forward current to the phase lines of the exciting salient pole pairs D and H on the stator, so that the salient poles of the exciting salient pole pairs D and H on the stator produce a magnetic expelling pushing force against the salient poles of the permanent magnet salient pole pairs III and VI on the rotor; after a short time period, the salient pole radial centerlines of exciting salient pole pairs B and F on the stator and the salient pole radial centerlines of permanent magnet salient pole pairs II and V on the rotor coincide, and other stator exciting salient pole pairs repeat in turn the afore-said attracting and expelling process on the rotor permanent magnet salient pole pairs. It goes on cyclically in this, to make the rotor rotate steadily counterclockwise. A position sensor is provided between the rotor and stator, when the salient pole radial centerline of a permanent magnet salient pole pair on the rotor and the salient pole radial centerline of an exciting salient pole pair of the stator are fully aligned and coincided, the position sensor sends a signal to the excitation control power source, which then transiently reduce the exciting current in the phase lines of the stator exciting salient pole pair with radial centerline coincided to zero and then changes its direction.

Embodiment 10

This embodiment is an outer rotor switched reluctance motor with two salient poles of stator exciting salient pole pairs and the two salient poles of rotor permanent magnet salient pole pairs all radially arranged. As shown in Attached FIG. 24 and Attached FIG. 25.

The rotor in this embodiment is formed by the cylindrical magnetizer 801 and 6 permanent magnet blocks 802, the 6 permanent magnet blocks, with the rotating shaft as symmetric axis, are symmetrically set at equal spacing on inner wall of the cylindrical magnetizer 801, and the salient poles of the adjacent two permanent magnet blocks are in opposite magnetic polarity, the adjacent two permanent magnet salient poles, via the magnetic connection by the cylindrical magnetizer, form the "permanent magnet salient pole pair", the cylindrical magnetizer is in fixed connection with the rotating shaft via a non-magnetic conducting connecting plate; the stator in this embodiment is formed by 4 exciting salient pole pairs, each exciting salient pole pair is formed by the laminated iron core with two salient poles 803 and the exciting coil 804 wound around this laminated iron core, the 4 exciting salient pole pairs, with the rotating shaft as symmetric axis, are symmetrically set at equal spacing around the stator base 805, the vertical plane where the salient poles of the four stator exciting salient pole pairs are located coincides with the rotating vertical plane formed by the rotation of the salient poles of the rotor permanent magnet salient pole pair, the angle between the radial centerlines of the two salient poles of each stator exciting salient pole pair and the angle between the radial centerlines of the two permanent magnet salient poles of the rotor permanent magnet salient pole pair are equal, the exciting coils of the 4 stator exciting salient pole pairs are respectively excited and controlled by exciting current in four phase lines.

Figure 24:
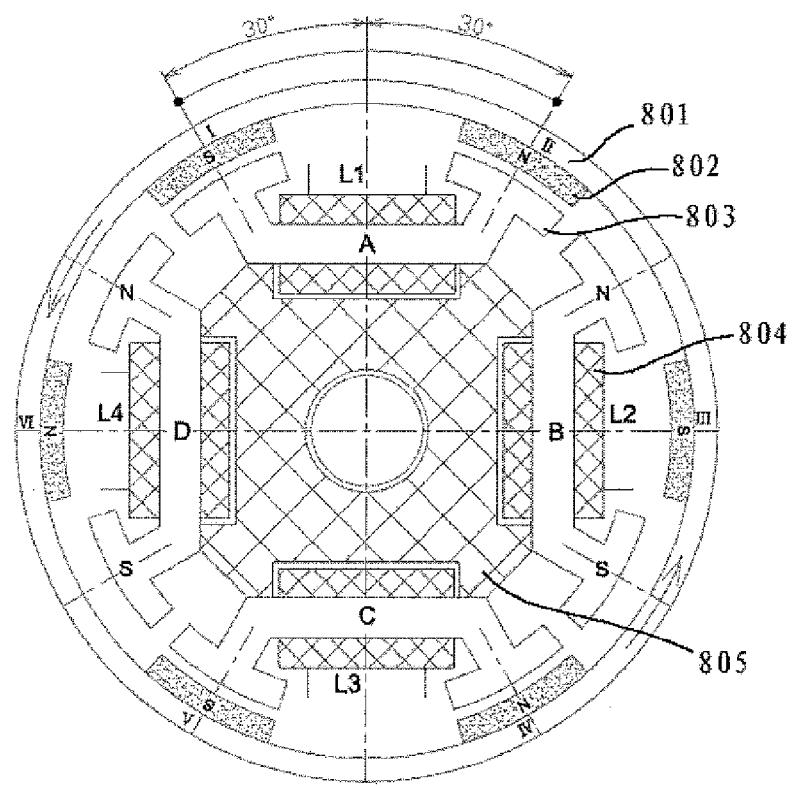
FIG. 24 is the structural sectional view of stator and rotor at a given position in Embodiment 10 of this invention.
Figure 25:
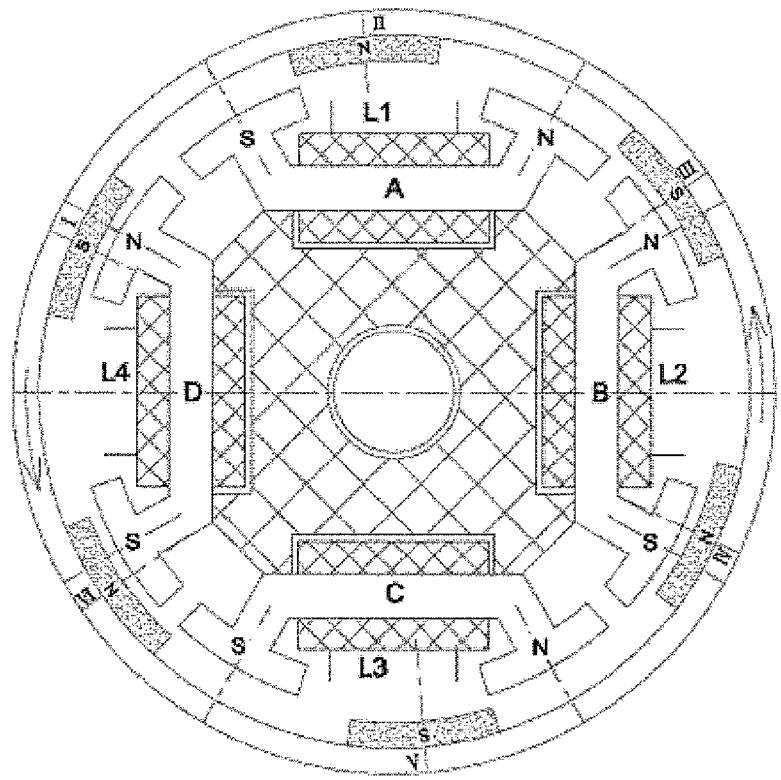
FIG. 25 is the structural sectional view of stator and rotor at another position in Embodiment 10 of this invention.

In Attached FIG. 24, the angle between the radial centerlines of the two salient poles of exciting salient pole pair A is 60 degrees, the angle between the radial centerlines of salient pole I and salient pole II of the permanent magnet salient pole pair is also 60 degrees, similarly, the angle between the radial centerlines of the two salient poles of exciting salient pole pair C is 60 degrees, the angle between the radial centerlines of salient pole IV and salient pole V of the permanent magnet salient pole pair is also 60 degrees. A shortest magnetic circuit is formed between exciting salient pole pair A and salient pole I and salient pole II of the permanent magnet salient pole pair, a shortest magnetic circuit is formed between exciting salient pole pair C and salient pole IV and salient pole V of the permanent magnet salient pole pair the rotation acting force between exciting salient pole pair A and salient pole I and salient pole II of the permanent magnet salient pole pair, and between exciting salient pole pair C and salient pole IV and salient pole V of the permanent magnet salient pole pair disappears, at this moment, the N salient pole of exciting salient pole pair B not only produces a repelling force against permanent magnet salient pole II, but also produces an attracting force on permanent magnet salient pole III, the S salient pole of exciting salient pole pair B not only produces a repelling force against permanent magnet salient pole III, but also produces an attracting force on permanent magnet salient pole IV, the S salient pole of exciting salient pole pair D not only produces a repelling force against permanent magnet salient pole V, but also produces an attracting force on permanent magnet salient pole VI, the N salient pole of exciting salient pole pair D not only produces a repelling force against permanent magnet salient pole VI, but also produces an attracting force on permanent magnet salient pole I.

Between the stator and rotor of this embodiment, a position sensor is provided, once the radial centerlines of two salient poles of the permanent magnet salient pole pairs on the rotor and the radial centerlines of two salient poles of the exciting salient pole pair coincide, as exciting salient pole pairs A and C shown in Attached FIG. 24, the position sensor outputs a signal to the excitation control power source, the excitation control power source first reduces the exciting current in the exciting coils L1 and L3 of exciting salient pole pair A and C to zero, and right after input an exciting current in reversed direction, to change the magnetic polarity of the salient poles of exciting salient pole pairs A and C. Exciting salient pole pairs A and C with changed magnetic polarity again produce acting force on the permanent magnet salient pole pairs.

In this embodiment, the situation of salient poles of the exciting salient pole pair and the salient poles of the permanent magnet salient pole pair "strictly opposite" occurs every 30 degrees the rotor rotates, and the current in the exciting coils of exciting salient pole pairs changes direction, this goes on cyclically, the magnetic polarity of the salient poles of the exciting salient pole pairs on the stator also changes cyclically, maintaining the magnetic acting force on the salient poles of the permanent magnet salient pole pairs at all times.

The excitation control power source in this embodiment can be greatly simplified, because the control condition is unique, and is only related to the relative positions of the exciting salient pole pairs and permanent magnet salient pole pairs. Furthermore, this embodiment can provide higher torque and output power density as compared with the traditional "8 to 6" doubly salient switched reluctance motors. This is because the exciting salient pole pairs do not make work to the rotor rotation only in a short time period when the permanent magnet salient pole pairs form a short magnetic circuit (i.e. the radial centerlines of the two salient poles of the exciting salient pole pair coincide with the radial centerlines of the two salient poles of the permanent magnet salient pole pair), and in all other times, all four exciting salient pole pairs are doing work, i.e. "pushing and pulling" the permanent magnet salient pole pairs, as shown in Attached FIG. 25.

Embodiment 11

This embodiment is an inner rotor switched reluctance motor with two salient poles of stator exciting salient pole pairs and the two salient poles of rotor permanent magnet salient pole pairs all radially arranged. As shown in Attached FIG. 26 and Attached FIG. 27.

The rotor in this embodiment is formed by the rotor base 906, cylindrical magnetizer 905 and 6 permanent magnet blocks 904, the rotating shaft 907 is fixed on rotor base 906, the cylindrical magnetizer 905 surrounds the rotor base 906, the 6 permanent magnet blocks, with the rotating shaft as symmetric axis, are symmetrically set at equal spacing outside the cylindrical magnetizer, and the adjacent two salient poles are in opposite magnetic polarity, the adjacent two permanent magnet salient poles, via the magnetic connection by the cylindrical magnetizer 905, form a permanent magnet salient pole pair; the stator in this embodiment is formed by 4 exciting salient pole pairs, each exciting salient pole pair is formed by the laminated iron core with two salient poles 903 and the exciting coil 902 wound around this laminated iron core, the 4 exciting salient pole pairs, with the rotating shaft as symmetric axis, are symmetrically set at equal spacing on the inner wall of the motor housing 901, the vertical plane where the salient poles of the four stator exciting salient pole pairs are located coincides with the rotating vertical plane formed by the rotation of the salient poles of the rotor permanent magnet salient pole pair, the angle between the radial centerlines of any two permanent magnet salient poles of the rotor permanent magnet salient pole pair and the angle between the radial centerlines of the two salient poles of each stator exciting salient pole pair are equal, the exciting coils of the 4 stator exciting salient pole pairs are respectively excited and controlled by exciting current in four phase lines.

Figure 26:
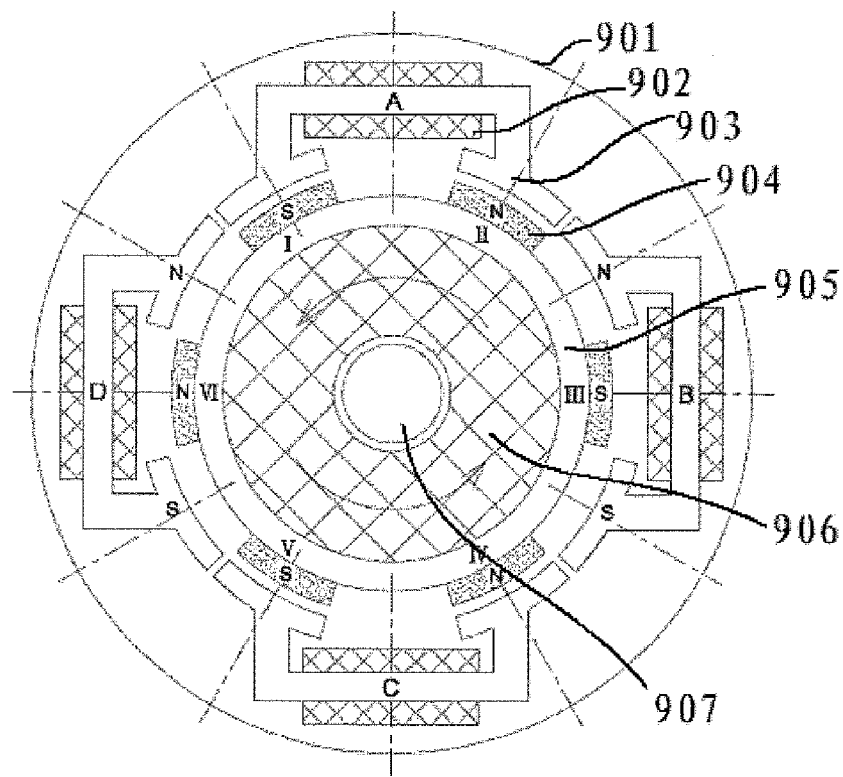
FIG. 26 is the structural sectional view of stator and rotor at a given position in Embodiment 11 of this invention.
Figure 27:
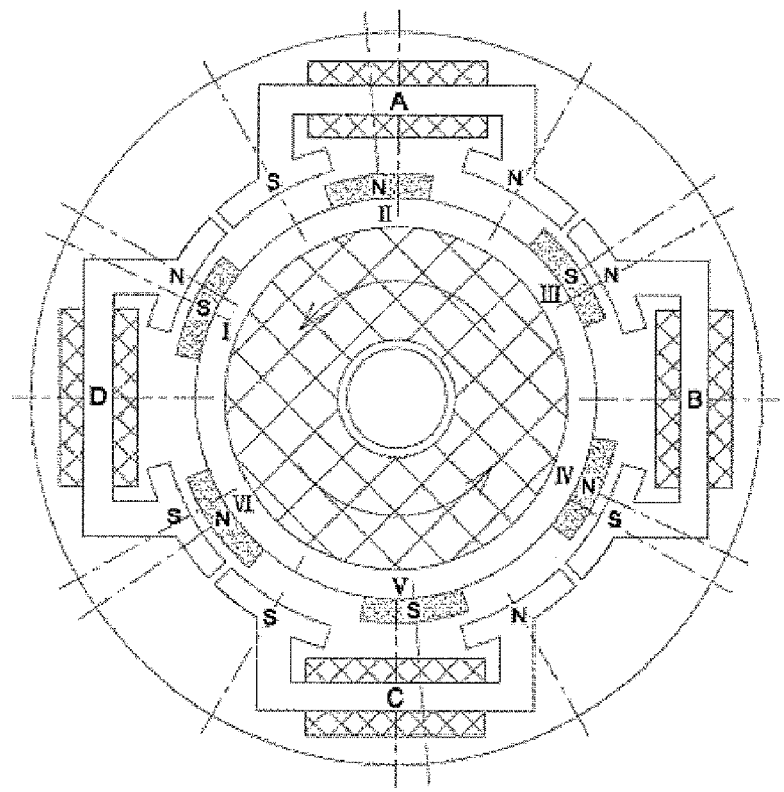
FIG. 27 is the structural sectional view of stator and rotor at another position in Embodiment 11 of this invention.

In Attached FIG. 26, the angle between the radial centerlines of the two salient poles of exciting salient pole pair A is 60 degrees, the angle between the radial centerlines of salient pole I and salient pole II of the permanent magnet salient pole pair is also 60 degrees, similarly, the angle between the radial centerlines of the two salient poles of exciting salient pole pair C is 60 degrees, the angle between the radial centerlines of salient pole IV and salient pole V of the permanent magnet salient pole pair is also 60 degrees. A shortest magnetic circuit is formed between exciting salient pole pair A and salient pole I and salient pole II of the permanent magnet salient pole pair, a shortest magnetic circuit is formed between exciting salient pole pair C and salient pole IV and salient pole V of the permanent magnet salient pole pair the rotation acting force between exciting salient pole pair A and salient pole I and salient pole II of the permanent magnet salient pole pair, and between exciting salient pole pair C and salient pole IV and salient pole V of the permanent magnet salient pole pair disappears, at this moment, the N salient pole of exciting salient pole pair B not only produces a repelling force against permanent magnet salient pole II, but also produces an attracting force on permanent magnet salient pole III, the S salient pole of exciting salient pole pair B not only produces a repelling force against permanent magnet salient pole III, but also produces an attracting force on permanent magnet salient pole IV, the S salient pole of exciting salient pole pair D not only produces a repelling force against permanent magnet salient pole V, but also produces an attracting force on permanent magnet salient pole VI, the N salient pole of exciting salient pole pair D not only produces a repelling force against permanent magnet salient pole VI, but also produces an attracting force on permanent magnet salient pole I.

Between the stator and rotor of this embodiment, a position sensor is provided, once the radial centerlines of two salient poles of the permanent magnet salient pole pairs on the rotor and the radial centerlines of two salient poles of the exciting salient pole pair coincide, as exciting salient pole pairs A and C shown in Attached FIG. 26, the position sensor outputs a signal to the excitation control power source, the excitation control power source changes the direction of the exciting current in the exciting coils of exciting salient pole pairs A and C, to change the magnetic polarity of the salient poles of exciting salient pole pairs A and C. Exciting salient pole pairs A and C with changed magnetic polarity again produce acting force on the permanent magnet salient poles.

In this embodiment, the situation of salient poles of the exciting salient pole pair and the permanent magnet salient pole pair "strictly opposite" occurs every 30 degrees the rotor rotates, and the current in the exciting coils of exciting salient pole pairs changes direction, this goes on cyclically, the magnetic polarity of the salient poles of the exciting salient pole pairs on the stator also changes cyclically, maintaining the magnetic acting force on the salient poles of the permanent magnet salient pole pairs at all times.

In this embodiment, the exciting coils of two stator exciting salient pole pairs at opposite positions can be mutually connected in series or in parallel, to be excited and controlled by two phases of exciting current, in this way, the excitation control power source can be further simplified, because the control condition is unique, and is only related to the relative positions of the exciting salient pole pairs and permanent magnet salient pole pairs. Furthermore, the exciting salient pole pairs of the motor in this embodiment do not make work to the rotor rotation only in a short time period when the permanent magnet salient pole pairs form the shortest magnetic circuit, and in all other times, all four exciting salient pole pairs are doing work, i.e. "pushing and pulling" the permanent magnet salient pole pairs, as shown in Attached FIG. 27. Therefore, this embodiment can provide higher torque and output power as compared with the traditional "8 to 6" doubly salient switched reluctance motors.

The invention claimed is:

1. A permanent magnetic switched reluctance motor, comprising
a motor housing;
a stator includes a number of strip-shaped exciting salient pole pairs, the exciting salient pole pairs, with regard to motor rotating shaft having a rotating axis being arranged annularly and symmetrically at equal spacing along a concentric circle, and all exciting salient pole pairs being mutually in a magnetically isolated state; and
a rotor that includes a number of strip-shaped permanent magnet salient pole pairs,
wherein the permanent magnet salient pole pairs, with regard to motor rotating shaft are arranged annularly and symmetrically at equal spacing along a concentric circle, the salient poles of adjacent permanent magnet salient pole pairs are in opposite magnetic polarity, and the permanent magnet salient pole pairs on the rotor has the same salient pole axial thickness as that of the exciting salient pole pairs on the stator, and
wherein when the rotor rotates, a rotating vertical plane perpendicular to the rotating shaft formed by the salient poles of the permanent magnet salient pole pairs on the rotor coincides with a vertical plane perpendicular to the rotating shaft formed by the salient poles of the stator exciting salient pole pairs, and the radial centerline of two salient poles of any rotor permanent magnet salient pole pair can respectively coincide with the radial centerline of two salient poles of any stator exciting salient pole pair.

2. A switched reluctance motor according to claim 1,
wherein the exciting salient pole pair includes a laminated iron core and exciting coils, the exciting coil is wound around the laminated iron core, two ends of the laminated iron core extending out of the exciting coil constitute the two salient poles, when current of the same direction is input into the exciting coil, the salient poles are in opposite magnetic polarity;
wherein
the permanent magnet salient pole pair includes two permanent magnets and one magnetizer, one end of the magnetizer is connected to an N pole of a permanent magnet, the other end of the magnetizer is connected to an S pole of a permanent magnet, forming a permanent magnet salient pole pair with the S pole and the N pole; or
the permanent magnet salient pole pair includes a permanent magnet and two magnetizers, one magnetizer is connected to the N pole, the other magnetizer is connected to the S pole, also forming a permanent magnet salient pole pair with the N pole and the S pole.

3. A switched reluctance motor according to claim 2,
wherein eight exciting salient pole pairs are on the stator, the eight exciting salient pole pairs, with regard to the motor rotating shaft, are arranged annularly and symmetrically at equal spacing along a concentric circle, and the S magnetic salient pole and N magnetic salient pole of each exciting salient pole pair are axially arranged along the rotating shaft, the eight exciting salient pole pairs are mutually in a magnetically isolated state;
wherein six permanent magnet salient pole pairs are on the rotor, the six permanent magnet salient pole pairs, with regard to the motor rotating shaft, are arranged annularly and symmetrically at equal spacing along a concentric circle around the rotor base, each permanent magnet salient pole pair consists of a strip-shaped magnetizer and two permanent magnets, one end of the strip-shaped magnetizer is connected to the N pole of a permanent magnet, the other end of the strip-shaped magnetizer is connected to the S pole of another permanent magnet, the N pole salient pole and S pole salient pole of each permanent magnet salient pole pair are axially arranged along the rotating shaft, and the salient poles of adjacent permanent magnet salient pole pairs are in opposite magnetic polarity,
wherein the vertical plane where the salient poles of the stator exciting salient pole pairs are located coincided with the rotating plane formed by the rotor permanent magnet salient pole pairs rotating salient poles; the exciting coils of the eight exciting salient pole pair are divided into four groups, the two exciting salient pole pairs on the same diameter line are in the same group, the exciting coils of the same group of exciting salient pole pairs are connected in series or in parallel, and the four groups of exciting salient pole pairs are respectively excited and controlled by four phases of exciting current.

4. A switched reluctance motor according to claim 3,
wherein the eight stator exciting salient pole pairs and the six rotor permanent magnet salient pole pairs form an individual motor, the rotating shafts of two or more such individual motors are axially connected, and
all exciting salient pole pairs of different individual motor stators are at completely identical position in space, such that the radial centerlines of salient poles of the exciting salient pole pairs of different individual motor stators coincide, and between the radial centerlines of salient poles of different individual motor rotor permanent magnet salient pole pairs, the rotating angle around the rotating shaft in sequence in the same direction is 0 to 30 degrees.

5. A switched reluctance motor according to claim 1,
wherein the number of the exciting salient pole pairs on the stator is 6 or 8 or 10 or 12 or 14 or 16 or 18, and
wherein the number of the permanent magnet salient pole pairs on the corresponding rotor is 4 or 6 or 8 or 10 or 12 or 14 or 16, respectively in correspondence of one by one with respect to the number of doubly salient pole iron core components wound with exciting coils on the stator.

6. A switched reluctance motor according to claim 5,
wherein eight exciting salient pole pairs are on the stator, the eight exciting salient pole pairs, with regard to the motor rotating shaft, are arranged annularly and symmetrically at equal spacing along a concentric circle, and the S magnetic salient pole and N magnetic salient pole of each exciting salient pole pair are axially arranged along the rotating shaft, the eight exciting salient pole pairs are mutually in a magnetically isolated state;

wherein there are six permanent magnet salient pole pairs are on the rotor, the six permanent magnet salient pole pairs, with the motor rotating shaft as symmetric axis, are arranged annularly and symmetrically at equal spacing along a concentric circle around the rotor base, each permanent magnet salient pole pair consists of a strip-shaped magnetizer and two permanent magnets, one end of the strip-shaped magnetizer is connected to the N pole of a permanent magnet, the other end of the strip-shaped magnetizer is connected to the S pole of another permanent magnet, the N pole salient pole and S pole salient pole of each permanent magnet salient pole pair are axially arranged along the rotating shaft, and the salient poles of adjacent permanent magnet salient pole pairs are in opposite magnetic polarity, wherein the vertical plane where the salient poles of the stator exciting salient pole pairs are located coincided with the rotating plane formed by the rotor permanent magnet salient pole pairs rotating salient poles; the exciting coils of the eight exciting salient pole pair are divided into four groups, the two exciting salient pole pairs on the same diameter line are in the same group, the exciting coils of the same group of exciting salient pole pairs are connected in series or in parallel, and the four groups of exciting salient pole pairs are respectively excited and controlled by four phases of exciting current.

7. A switched reluctance motor according to claim 6, wherein the eight stator exciting salient pole pairs and the six rotor permanent magnet salient pole pairs form an individual motor, the rotating shafts of two or more such individual motors are axially connected, and all exciting salient pole pairs of different individual motor stators are at completely identical position in space, such that the radial centerlines of salient poles of the exciting salient pole pairs of different individual motor stators coincide, and between the radial centerlines of salient poles of different individual motor rotor permanent magnet salient pole pairs, the rotating angle around the rotating shaft in sequence in the same direction is 0 to 30 degrees.

8. A switched reluctance motor according to claim 1, wherein eight exciting salient pole pairs are on the stator, the eight exciting salient pole pairs, with regard to the motor rotating shaft, are arranged annularly and symmetrically at equal spacing along a concentric circle, and the S magnetic salient pole and N magnetic salient pole of each exciting salient pole pair are axially arranged along the rotating shaft, the eight exciting salient pole pairs are mutually in a magnetically isolated state;

wherein six permanent magnet salient pole pairs are on the rotor, the six permanent magnet salient pole pairs, with regard to the motor rotating shaft, are arranged annularly and symmetrically at equal spacing along a concentric circle around the rotor base, each permanent magnet salient pole pair consists of a strip-shaped magnetizer and two permanent magnets, one end of the strip-shaped magnetizer is connected to the N pole of a permanent magnet, the other end of the strip-shaped magnetizer is connected to the S pole of another permanent magnet, the N pole salient pole and S pole salient pole of each permanent magnet salient pole pair are axially arranged along the rotating shaft, and the salient poles of adjacent permanent magnet salient pole pairs are in opposite magnetic polarity, wherein the vertical plane where the salient poles of the stator exciting salient pole pairs are located coincided with the rotating plane formed by the rotor permanent magnet salient pole pairs rotating salient poles; the exciting coils of the eight exciting salient pole pair are divided into four groups, the two exciting salient pole pairs on the same diameter line are in the same group, the exciting coils of the same group of exciting salient pole pairs are connected in series or in parallel, and the four groups of exciting salient pole pairs are respectively excited and controlled by four phases of exciting current.

9. A switched reluctance motor according to claim 8, wherein the eight stator exciting salient pole pairs and the six rotor permanent magnet salient pole pairs form an individual motor, the rotating shafts of two or more such individual motors are axially connected, and all exciting salient pole pairs of different individual motor stators are at completely identical position in space, such that the radial centerlines of salient poles of the exciting salient pole pairs of different individual motor stators coincide, and between the radial centerlines of salient poles of different individual motor rotor permanent magnet salient pole pairs, the rotating angle around the rotating shaft in sequence in the same direction is 0 to 30 degrees.

10. A switched reluctance motor according to claim 1, wherein the rotor includes the motor external rotating housing and an even number of permanent magnet salient pole pairs, the permanent magnet salient pole pairs are arranged along the motor external rotating housing inner wall annularly at equal spacing, the N pole salient pole and S pole salient pole of each permanent magnet salient pole pair are axially arranged along the rotating shaft, the stator of the motor includes the base and an even number of exciting salient pole pairs, the exciting salient pole pairs, with the rotating shaft as symmetric axis, are symmetrically set at equal spacing around the base, and the exciting salient pole pairs are mutually in a magnetically isolated state, the two magnetic salient poles of each exciting salient pole pair are axially arranged along the rotating shaft, the vertical plane where the salient poles of the stator exciting salient pole pairs are located coincided with the rotating vertical plane formed by the rotation of the salient poles of rotor permanent magnet salient pole pair, and the exciting coils of the two stator exciting salient pole pairs at positions of the same diameter are connected in series or in parallel, and are excited and controlled by the exciting current of the same phase;

or the rotor includes the cylindrical magnetizer and six permanent magnet blocks, the six permanent magnet blocks, with the rotating shaft as symmetric axis, are symmetrically set at equal spacing on inner wall of the cylindrical magnetizer, and the salient poles of the adjacent two permanent magnet blocks are in opposite magnetic polarity, the adjacent two permanent magnet blocks, via the magnetic connection by the cylindrical magnetizer, form the permanent magnet salient pole pairs, the cylindrical magnetizer is in fixed connection with the rotating shaft via a non-magnetic conducting connecting plate;

wherein the stator is formed by four exciting salient pole pairs, and each exciting salient pole pair is formed by the laminated iron core with two salient poles and the exciting coils wound around the laminated iron core, the four exciting salient pole pairs, with the rotating shaft as symmetric axis, are symmetrically set at equal spacing around the stator base, the four exciting salient pole pairs are mutually in a magnetically isolated state, the vertical plane where the four salient poles of the stator exciting salient pole pairs are located coincides with the rotating vertical plane formed by the rotation of the rotor permanent magnet salient pole pair salient pole, the circle center angle between the radial centerlines of the two salient poles of each stator exciting salient pole pair and circle center angle between the radial centerlines of the two permanent magnet salient poles of rotor permanent magnet salient pole pair are equal, wherein the exciting coils of the four stator exciting salient pole pairs are respectively excited and controlled by four phases of exciting current, or the exciting coils of two stator exciting salient pole pairs at opposite positions are mutually connected in series or parallel, and excited controlled by two phases of exciting current;

or the rotor includes the rotor base, cylindrical magnetizer and six permanent magnets, the rotating shaft is fixed with the rotor base, the cylindrical magnetizer surrounds the rotor base, the six permanent magnets, with regard to the rotating shaft, are symmetrically set at equal spacing around the cylindrical magnetizer, and the adjacent two permanent magnet salient poles are in opposite magnetic polarity, the adjacent two permanent magnets, via the magnetic connection by the cylindrical magnetizer, form the permanent magnet salient pole pair;

wherein the stator includes four exciting salient pole pairs, each exciting salient pole pair is formed by the laminated iron core with two salient poles and the exciting coils wound around the laminated iron core, the four exciting salient pole pairs, with regard to the rotating shaft, are symmetrically set at equal spacing on motor housing inner wall, and the vertical plane where the four salient poles of the stator exciting salient pole pairs are located coincided with the vertical plane formed by the rotation of the rotor permanent magnet salient pole pair salient poles, the circle center angle between the radial centerlines of any two permanent magnet salient poles of the rotor permanent magnet salient pole pair and the circle center angle between the radial centerlines of the two salient poles of each stator exciting salient pole pair are equal, wherein the exciting coils of the four stator exciting salient pole pairs are respectively excited and controlled by four phases of exciting current, or the exciting coils of two stator exciting salient pole pairs at opposite positions are mutually connected in series or parallel, and excited controlled by two phases of exciting current.

11. The permanent magnetic switched reluctance motor according to claim 1, wherein two salient poles of the exciting salient pole pairs are arranged radially, and the S and N poles of the permanent magnet salient pole pairs are arranged radially.

12. An excitation control method for a switched reluctance motor having a rotor with strip-shaped switch components, a stator with strip-shaped switch components, a position sensor and an excitation control power source, said method comprising:

sending stator and rotor position signals by the position sensor to the excitation control power source;

controlling, by the excitation control power source, start and end moment of supplying power to each phase line of the stator, wherein exciting coils of two stator switch components of the stator at axially symmetric positions with respect to a rotation axis of the motor are connected in series or in parallel to form one phase line, and the stator has a total of M phase lines;

supplying power by the excitation control power source to the M phase lines on the stator in sequence and cyclically;

stopping the power supplying by the excitation control power source to phase (M−1) in a time period $TM_{stator}$ during which the excitation control power source supplies power to phase M, wherein moment $t1_{stator\ on}$ and moment $t(M-1)_{stator\ off}$ are both in the time period $TM_{stator}$, where $(M-1)_{stator\ off}$ is a moment of the excitation control power source stopping the power supplying to phase (M−1), $t1_{stator\ on}$ is a moment of the excitation control power source starting the power supplying to phase 1, and $\Delta t_{stator} = t(M-1)_{stator\ off} - t1_{stator\ on}$ is a time difference between $t1_{stator\ on}$ and $t(M-1)_{stator\ off}$;

only when $\Delta t_{stator}$ is not zero, simultaneously supplying power by the excitation control power source to three phases of the stator switch components that are adjacent to phase M; and only when $\Delta t_{stator}$ is zero, simultaneously supplying power by the excitation control power source to two phases of the stator switch components that are adjacent to phase M.

13. An excitation control method for a switched reluctance motor having a rotor, a stator, a position sensor and an excitation control power source, said method comprising:

sending stator and rotor position signals by the position sensor to the excitation control power source;

controlling, by the excitation control power source, start and end time of supplying power to various phase lines of the motor stator and rotor, wherein two strip-shaped stator electric excitation permanent magnetic switch components of the stator at axially symmetric positions with respect of a rotation axis of the motor are connected in series or in parallel, and then connected as one phase to the excitation control power source, to form a total of M phase lines, and wherein exciting coils of two strip-shaped rotor electric excitation permanent magnetic switch components of the rotor each having a permanent magnet at axially symmetric positions of the rotation axis are connected in series or in parallel, and then connected as one phase to the excitation control power source, to form a total of N phases;

supplying power by the excitation control power source to M phase lines on the stator in sequence and cyclically;

supplying power concurrently by the excitation control power source to N phase lines on the rotor in sequence and cyclically;

stopping the power supplying by the excitation control power source to phase (M−1) in a time period $TM_{stator}$ during which the excitation control power source supplies power to phase M, wherein moment $t1_{stator\ on}$ and moment $t(M-1)_{stator\ off}$ are both in the time period $TM_{stator}$, where $(M-1)_{stator\ off}$ is a moment of the excitation control power source stopping the power supplying to phase (M-1), $t1_{stator\ on}$ is a moment of the excitation control power source starting the power supplying to phase 1 of the stator, and $\Delta t_{stator} = t(M-1)_{stator\ off} - t1_{stator\ on}$ is a time difference between $t1_{stator\ on}$ and $t(M-1)_{stator\ off}$;

only when $\Delta t_{stator}$ is not zero, simultaneously supplying power by the excitation control power source to three phases of the stator switch components that are adjacent to phase M; and only when $\Delta t_{stator}$ is zero, simultaneously supplying power by the excitation control power source to two phases of the stator switch components that are adjacent to phase M;

supplying power by the excitation control power source to N phase lines on the rotor in sequence and cyclically;

stopping the power supplying by the excitation control power source to the (N-1)th phase in a time period $TN_{rotor}$ during which the excitation control power source supplies power to phase N of the rotor, wherein moment $t1_{rotor\ on}$ and moment $t(N-1)_{rotor\ off}$ are both in the time period $TM_{rotor}$, where $t(N-1)_{rotor\ off}$ is a moment of the excitation control power source stopping the power supplying to phase (N-1), $t1_{rotor\ on}$ is a moment of the excitation control power source starting the power supplying to phase 1, and $\Delta t_{rotor} = t(M-1)_{rotor\ on} - t1_{rotor\ off}$ is a time difference between $t1_{rotor\ off}$ and $t(M-1)_{rotor\ on}$;

when $\Delta t_{rotor}$ is not zero, supplying power by the excitation control power source to one phase of the rotor switch component; and only when $\Delta t_{rotor}$ is zero, supplying power simultaneously by the excitation control power source to both phases of the rotor switch component.

14. An excitation control method for a switched reluctance motor having a motor rotating shaft, a rotor with a plurality of permanent magnet salient pole pairs, a stator with a plurality of exciting salient pole pairs, a position sensor and an excitation control power source, the method comprising:

(a) turning on a first current as an exciting current via the excitation control power source;

(b) producing a signal, by the position sensor, once a radial centerline of salient poles of a permanent magnet salient pole pair among the plurality of permanent magnet salient pole pairs on the rotor coincides with a radial centerline of salient poles of one exciting salient pole pair among the plurality of exciting salient pole pairs on the stator, the plurality of exciting salient pole pairs being arranged on the stator annularly and symmetrically at equal spacing along a concentric circle with the motor rotating shaft as symmetric axis, all exciting salient pole pairs being mutually in magnetically isolated state, the plurality of permanent magnet pole pairs being arranged on the rotor annularly and symmetrically at equal spacing along a concentric circle with the motor rotating shaft as symmetric axis, salient poles of adjacent permanent magnet salient pole pairs being in opposite magnetic polarity, the permanent magnet salient pole airs on the rotor having identical salient pole axial thickness as that of the exciting salient pole pairs on the stator, a rotating plane perpendicular to the rotating shaft and formed by the salient poles of the permanent magnet salient pole pairs on the rotor coinciding with a plane perpendicular to the rotating shaft and formed by the salient poles of the stator exciting salient pole pair when the rotor rotates;

(c) turning off the first current as the exciting current, via the excitation control power source upon receiving the signal, for an exciting coil of the one exciting salient pole pair with the coinciding radial centerline according to a predetermined control program; then (d) inputting a reverse current as a second current to, thereby changing magnetic polarity of, the one exciting salient pole pair with the coinciding radial centerline, while the exciting current in the other exciting salient pole pairs remains unchanged, until the radial centerline of another exciting salient pole pair coincides with the radial centerline of the one permanent magnet salient pole pair; and (e) cyclically repeating steps (b)-(d) with the previous second current as a new first current in a new cycle.

* * * * *